(12) United States Patent
Grail et al.

(10) Patent No.: US 11,205,296 B2
(45) Date of Patent: Dec. 21, 2021

(54) 3D DATA EXPLORATION USING INTERACTIVE CUBOIDS

(71) Applicant: SAP SE, Walldorf (DE)

(72) Inventors: Christian Grail, Zuzenhausen (DE); Joachim Fiess, Karlsruhe (DE); Tatjana Borovikov, Pfungstadt (DE); Judith Schneider, Sulzfeld (DE); Manfred Johann Pauli, Bad Schönborn (DE); Gisbert Loff, Hockenheim (DE); Hanswerner Dreissigacker, Ludwigshafen (DE); Klaus Herter, Leimen (DE); Hans-Juergen Richstein, Rauneberg (DE); Ian Robert Taylor, Mannheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/723,470

(22) Filed: Dec. 20, 2019

(65) Prior Publication Data
US 2021/0192832 A1    Jun. 24, 2021

(51) Int. Cl.
*G06T 15/08*  (2011.01)
*G06F 16/22*  (2019.01)
*G06T 19/20*  (2011.01)
*G06F 16/245* (2019.01)

(52) U.S. Cl.
CPC .......... *G06T 15/08* (2013.01); *G06F 16/2264* (2019.01); *G06F 16/245* (2019.01); *G06T 19/20* (2013.01); *G06T 2219/2016* (2013.01)

(58) Field of Classification Search
CPC . G06T 15/08; G06T 19/20; G06T 2219/2016; G06F 16/245; G06F 16/2264; G06F 16/2462; G06F 16/22; G06F 16/24542; G06F 16/283
See application file for complete search history.

(56) References Cited

U.S. PATENT DOCUMENTS

| | | | | |
|---|---|---|---|---|
| 5,499,306 A | * | 3/1996 | Sasaki | B25J 9/1697 382/153 |
| 5,504,821 A | * | 4/1996 | Kanamori | G06F 17/17 348/650 |
| 5,588,098 A | * | 12/1996 | Chen | G06F 3/04845 345/653 |
| 5,926,820 A | * | 7/1999 | Agrawal | G06F 16/2264 |
| 6,326,988 B1 | * | 12/2001 | Gould | G06F 3/04815 715/850 |

(Continued)

*Primary Examiner* — Charles L Beard
(74) *Attorney, Agent, or Firm* — Sterne, Kessler, Goldstein & Fox P.L.L.C.

(57) ABSTRACT

Rendering multi-dimensional data in a polyhedron, such as a cube, in a 3D environment allows for the ease of visualization of, and interaction with, the underlying data. The approaches herein allow for 3D manipulation of records within the underlying data by filtering the records across elements of a particular dimension. These records may be filtered by physically grabbing a 'drawer'—a slice of data within the polyhedron—and removing the drawer to a separate space. That drawer then represents all of the underlying records filtered by that slice, and can be further manipulated by additional filtering, or by merging multiple drawers together.

17 Claims, 19 Drawing Sheets

(56) References Cited

U.S. PATENT DOCUMENTS

| | | | |
|---|---|---|---|
| 6,424,344 B1 * | 7/2002 | Lee | G06T 9/00 345/419 |
| 6,434,544 B1 * | 8/2002 | Bakalash | G06F 16/24556 |
| 6,466,237 B1 * | 10/2002 | Miyao | G06F 3/0483 715/838 |
| 6,542,895 B1 * | 4/2003 | DeKimpe | G06F 16/284 |
| 6,546,395 B1 * | 4/2003 | DeKimpe | G06F 16/283 |
| 6,597,358 B2 * | 7/2003 | Miller | G06F 3/04815 345/427 |
| 6,629,065 B1 * | 9/2003 | Gadh | G06F 30/17 703/1 |
| 6,661,426 B1 * | 12/2003 | Jetha | H04N 21/4622 345/629 |
| 6,798,843 B1 * | 9/2004 | Wright | H03F 1/3241 330/149 |
| 6,801,908 B1 * | 10/2004 | Fuloria | G06F 16/283 |
| 7,194,465 B1 * | 3/2007 | MacGregor | G06F 16/2462 |
| 7,284,011 B1 * | 10/2007 | Narayanaswamy | G06F 16/283 707/700 |
| 7,383,279 B2 * | 6/2008 | Tare | G06F 16/345 707/603 |
| 7,417,762 B2 * | 8/2008 | Arai | H04N 1/6033 345/591 |
| 7,639,256 B1 * | 12/2009 | Yablonski | G06T 11/206 345/440 |
| 7,692,648 B2 * | 4/2010 | Engel | G06T 15/08 345/421 |
| 7,756,907 B2 * | 7/2010 | Stolte | G06F 16/26 707/805 |
| 7,917,868 B2 * | 3/2011 | Ok | G06F 3/04815 715/848 |
| 7,979,672 B2 * | 7/2011 | El-Mahdy | G06F 9/30032 712/17 |
| 8,111,255 B2 * | 2/2012 | Park | G06F 3/0482 345/419 |
| 8,234,298 B2 * | 7/2012 | Winter | G06F 16/283 707/776 |
| 8,237,736 B2 * | 8/2012 | Flick | G09G 5/026 345/593 |
| 8,606,827 B2 * | 12/2013 | Williamson | G06F 16/283 707/804 |
| 8,766,997 B1 * | 7/2014 | Hickman | G06T 17/00 345/581 |
| 8,799,207 B1 * | 8/2014 | Stolte | G06F 16/283 707/602 |
| 8,868,544 B2 * | 10/2014 | Witkowski | G06F 16/283 707/713 |
| 8,965,836 B1 * | 2/2015 | Stolte | G06F 16/283 707/600 |
| 8,965,866 B2 * | 2/2015 | Varghese | G06F 16/283 707/705 |
| 9,025,891 B2 * | 5/2015 | Terada | H04N 19/136 382/232 |
| 9,069,455 B2 * | 6/2015 | Sripada | G06F 3/04845 |
| 9,137,666 B1 * | 9/2015 | Bonn | H04W 12/06 |
| 9,171,055 B1 * | 10/2015 | Stolte | G06F 16/283 |
| 9,176,985 B2 * | 11/2015 | Baba | G06F 16/583 |
| 9,183,269 B1 * | 11/2015 | Stolte | G06F 16/283 |
| 9,330,091 B1 * | 5/2016 | Stolte | G06F 16/00 |
| 9,332,257 B2 * | 5/2016 | Joshi | H04N 19/645 |
| 9,423,929 B2 * | 8/2016 | Mattos | G06F 16/904 |
| 9,529,892 B2 * | 12/2016 | Tibrewal | G06F 3/04815 |
| 9,737,811 B1 * | 8/2017 | Penmatsa | A63F 13/35 |
| 9,753,132 B1 * | 9/2017 | Bordes | G01S 13/931 |
| 9,836,263 B2 * | 12/2017 | Kasahara | G06K 9/00671 |
| 9,922,437 B1 * | 3/2018 | Baron | G06T 19/006 |
| 9,959,795 B2 * | 5/2018 | Kim | G09G 3/001 |
| 10,089,147 B2 * | 10/2018 | Jamjoom | G06F 9/5011 |
| 10,289,972 B1 * | 5/2019 | Goyal | G06Q 10/06 |
| 10,318,545 B1 * | 6/2019 | Klippsten | G06F 3/04847 |
| 10,325,405 B1 * | 6/2019 | Falstrup | G06F 3/04886 |
| 10,346,950 B2 * | 7/2019 | Edwards | H04N 13/122 |
| 10,366,464 B2 * | 7/2019 | Williamson | G06Q 99/00 |
| 10,429,941 B2 * | 10/2019 | Kamoda | G06F 3/04842 |
| 10,573,057 B1 * | 2/2020 | Dixit | G06F 3/017 |
| 10,621,203 B2 * | 4/2020 | Hunt | G06F 16/283 |
| 10,671,241 B1 * | 6/2020 | Jia | G06F 3/04815 |
| 10,699,070 B2 * | 6/2020 | Walia | G06F 16/248 |
| 10,712,898 B2 * | 7/2020 | Christmas | G06F 3/04815 |
| 10,768,421 B1 * | 9/2020 | Rosenberg | G02B 27/017 |
| 11,079,901 B2 * | 8/2021 | Natarajan | G06F 3/04815 |
| 2001/0054034 A1 * | 12/2001 | Arning | G06F 16/2264 |
| 2002/0008709 A1 * | 1/2002 | Suzuki | H04N 1/6025 345/600 |
| 2002/0018066 A1 * | 2/2002 | Vizer | G09B 7/00 345/428 |
| 2002/0029207 A1 * | 3/2002 | Bakalash | G06F 16/30 |
| 2002/0091707 A1 * | 7/2002 | Keller | G06F 16/30 |
| 2002/0113865 A1 * | 8/2002 | Yano | H04N 13/239 348/47 |
| 2003/0004938 A1 * | 1/2003 | Lawder | G06F 16/2264 |
| 2003/0142136 A1 * | 7/2003 | Carter | G06F 3/04815 715/782 |
| 2003/0204534 A1 * | 10/2003 | Hopeman | G06F 16/284 |
| 2003/0208506 A1 * | 11/2003 | Greenfield | G06F 16/24539 |
| 2003/0229652 A1 * | 12/2003 | Bakalash | G06F 16/30 |
| 2004/0081340 A1 * | 4/2004 | Hashimoto | G01S 7/52036 382/128 |
| 2004/0122820 A1 * | 6/2004 | Malloy | G06F 16/2264 |
| 2004/0122844 A1 * | 6/2004 | Malloy | G06F 16/283 |
| 2004/0126007 A1 * | 7/2004 | Ziel | G06T 15/08 382/154 |
| 2004/0139061 A1 * | 7/2004 | Colossi | G06F 16/283 |
| 2004/0164957 A1 * | 8/2004 | Yamaguchi | G06T 19/20 345/156 |
| 2004/0181503 A1 * | 9/2004 | Moseler | G06F 16/2228 |
| 2004/0215626 A1 * | 10/2004 | Colossi | G06F 16/24542 |
| 2005/0012745 A1 * | 1/2005 | Kondo | H04N 7/18 345/427 |
| 2005/0013507 A1 * | 1/2005 | Lee | G06K 9/6255 382/284 |
| 2005/0047670 A1 * | 3/2005 | Qian | H03M 7/3082 382/253 |
| 2005/0057579 A1 * | 3/2005 | Young | G06T 19/20 345/649 |
| 2005/0060300 A1 * | 3/2005 | Stolte | G06F 16/26 |
| 2005/0151732 A1 * | 7/2005 | Yamaguchi | G06T 15/10 345/421 |
| 2005/0172007 A1 * | 8/2005 | Avrahami | G06F 16/283 709/219 |
| 2005/0174361 A1 * | 8/2005 | Kobayashi | G06F 3/0346 345/633 |
| 2005/0231532 A1 * | 10/2005 | Suzuki | G06F 3/0338 345/633 |
| 2006/0028543 A1 * | 2/2006 | Sohn | H04N 13/239 348/42 |
| 2006/0069698 A1 * | 3/2006 | Hintikka | G06Q 10/10 |
| 2006/0156228 A1 * | 7/2006 | Gallo | G06F 3/04842 715/202 |
| 2006/0206512 A1 * | 9/2006 | Hanrahan | G06T 11/206 |
| 2006/0258449 A1 * | 11/2006 | Yasui | G06T 13/20 463/31 |
| 2006/0274060 A1 * | 12/2006 | Ni | G06F 3/0482 345/419 |
| 2007/0008621 A1 * | 1/2007 | Satoh | G06T 19/20 359/465 |
| 2007/0018975 A1 * | 1/2007 | Chuanggui | A61B 90/36 345/419 |
| 2007/0027904 A1 * | 2/2007 | Chow | G06F 16/2452 |
| 2007/0033279 A1 * | 2/2007 | Battat | H04L 41/22 709/224 |
| 2007/0236514 A1 * | 10/2007 | Agusanto | G16H 50/50 345/646 |
| 2007/0238981 A1 * | 10/2007 | Zhu | A61B 90/36 600/424 |
| 2007/0248259 A1 * | 10/2007 | Liu | G06T 15/08 382/154 |
| 2008/0243778 A1 * | 10/2008 | Behnen | G06F 16/248 |
| 2008/0273082 A1 * | 11/2008 | Miyake | H04N 13/139 348/47 |

(56) References Cited

U.S. PATENT DOCUMENTS

| | | | |
|---|---|---|---|
| 2009/0006455 A1* | 1/2009 | Carroll | G06F 16/284 |
| 2009/0009515 A1* | 1/2009 | Tanaka | A63F 13/52 |
| | | | 345/426 |
| 2009/0019393 A1* | 1/2009 | Fukushima | G06F 3/0482 |
| | | | 715/810 |
| 2009/0027380 A1* | 1/2009 | Rajan | G06T 19/20 |
| | | | 345/419 |
| 2009/0136096 A1* | 5/2009 | Sirohey | G06T 7/0012 |
| | | | 382/128 |
| 2009/0198663 A1* | 8/2009 | Yang | G06F 16/283 |
| 2010/0156893 A1* | 6/2010 | Mihara | H04N 21/47 |
| | | | 345/419 |
| 2010/0306281 A1* | 12/2010 | Williamson | G06F 16/2465 |
| | | | 707/803 |
| 2011/0205341 A1* | 8/2011 | Wilson | G06F 3/011 |
| | | | 348/51 |
| 2011/0310100 A1* | 12/2011 | Adimatyam | G06F 3/0481 |
| | | | 345/420 |
| 2012/0038754 A1* | 2/2012 | Na | H04N 13/183 |
| | | | 348/51 |
| 2012/0174038 A1* | 7/2012 | Tamayo | G06F 3/0482 |
| | | | 715/849 |
| 2012/0197950 A1* | 8/2012 | Dayal | G06Q 30/02 |
| | | | 707/822 |
| 2012/0212490 A1* | 8/2012 | Salemann | G06T 17/05 |
| | | | 345/424 |
| 2012/0290976 A1* | 11/2012 | Lahm | G16H 40/63 |
| | | | 715/810 |
| 2012/0310874 A1* | 12/2012 | Dantressangle | G06F 16/221 |
| | | | 707/600 |
| 2012/0311474 A1* | 12/2012 | McPherson | G06F 16/26 |
| | | | 715/771 |
| 2012/0324401 A1* | 12/2012 | Morris | G06F 3/04815 |
| | | | 715/836 |
| 2013/0031142 A1* | 1/2013 | Wester | G06F 9/451 |
| | | | 707/802 |
| 2013/0054137 A1* | 2/2013 | Arai | G01C 21/32 |
| | | | 701/457 |
| 2013/0054510 A1* | 2/2013 | Beaumont | G06F 16/283 |
| | | | 707/601 |
| 2013/0054608 A1* | 2/2013 | Gong | G06F 16/2264 |
| | | | 707/741 |
| 2013/0076731 A1* | 3/2013 | Rolleston | G06T 15/00 |
| | | | 345/419 |
| 2013/0093756 A1* | 4/2013 | Davidson | G06F 3/04845 |
| | | | 345/419 |
| 2013/0097563 A1* | 4/2013 | Pacheco Rodrigues Velho | G06F 3/04815 |
| | | | 715/850 |
| 2013/0159307 A1* | 6/2013 | Wolge | G06F 3/048 |
| | | | 707/737 |
| 2013/0339291 A1* | 12/2013 | Hasner | G06F 16/283 |
| | | | 707/601 |
| 2014/0058998 A1* | 2/2014 | Schwerk | G06F 16/283 |
| | | | 707/603 |
| 2014/0140579 A1* | 5/2014 | Takemoto | G01C 3/08 |
| | | | 382/106 |
| 2014/0152661 A1* | 6/2014 | Nishiura | A61B 90/36 |
| | | | 345/424 |
| 2014/0156588 A1* | 6/2014 | Mohanty | G06F 16/283 |
| | | | 707/600 |
| 2014/0228119 A1* | 8/2014 | Koenig | A63F 13/52 |
| | | | 463/32 |
| 2014/0258938 A1* | 9/2014 | Christmas | G06F 3/04815 |
| | | | 715/849 |
| 2014/0279824 A1* | 9/2014 | Tamayo | G06F 16/2428 |
| | | | 707/600 |
| 2014/0279833 A1* | 9/2014 | Gong | G06F 16/254 |
| | | | 707/602 |
| 2014/0327667 A1* | 11/2014 | Kim | G06T 15/08 |
| | | | 345/419 |
| 2015/0007115 A1* | 1/2015 | Kleser | G06T 11/206 |
| | | | 715/854 |
| 2015/0015572 A1* | 1/2015 | Izumo | A61B 5/055 |
| | | | 345/419 |
| 2015/0073961 A1* | 3/2015 | Cristoforo | G06Q 40/04 |
| | | | 705/37 |
| 2015/0186728 A1* | 7/2015 | Kimura | G06K 9/00671 |
| | | | 345/633 |
| 2015/0205841 A1* | 7/2015 | Thiyagarajah | G06T 19/20 |
| | | | 707/722 |
| 2015/0278334 A1* | 10/2015 | Gerweck | G06F 16/284 |
| | | | 707/706 |
| 2015/0367230 A1* | 12/2015 | Bradford | A63F 9/0842 |
| | | | 463/9 |
| 2015/0381968 A1* | 12/2015 | Arora | G06T 17/00 |
| | | | 348/47 |
| 2016/0034115 A1* | 2/2016 | Natarajan | G06F 3/0481 |
| | | | 715/810 |
| 2016/0086028 A1* | 3/2016 | Francois | G06T 7/74 |
| | | | 348/46 |
| 2016/0179925 A1* | 6/2016 | Hsu | G06F 16/245 |
| | | | 707/722 |
| 2016/0191891 A1* | 6/2016 | Gilpin | H04N 13/239 |
| | | | 386/224 |
| 2016/0267705 A1* | 9/2016 | O'Leary | G06T 13/20 |
| 2016/0378843 A1* | 12/2016 | Cherwonka | G06F 16/248 |
| | | | 707/602 |
| 2017/0011082 A1* | 1/2017 | Velury | G06F 16/2386 |
| 2017/0034527 A1* | 2/2017 | Lee | H04N 19/70 |
| 2017/0103111 A1* | 4/2017 | Lavin | G06F 16/26 |
| 2017/0116227 A1* | 4/2017 | Shaked | G06F 16/283 |
| 2017/0116309 A1* | 4/2017 | Menon | G06F 9/5066 |
| 2017/0116313 A1* | 4/2017 | Roytman | G06F 16/90335 |
| 2017/0124770 A1* | 5/2017 | Vats | G06T 19/003 |
| 2017/0132846 A1* | 5/2017 | Iverson | G06T 17/00 |
| 2017/0147674 A1* | 5/2017 | Procops | G06F 16/211 |
| 2017/0154468 A1* | 6/2017 | Xu | G06T 17/00 |
| 2017/0168782 A1* | 6/2017 | Boyd | G06F 3/0481 |
| 2017/0169092 A1* | 6/2017 | Baird | G06F 16/2365 |
| 2017/0177636 A1* | 6/2017 | Nguyen | G06F 16/2477 |
| 2017/0357227 A1* | 12/2017 | Kummer | G06F 3/017 |
| 2018/0081921 A1* | 3/2018 | Willcock | G06F 16/2264 |
| 2018/0089336 A1* | 3/2018 | Ninomiya | G06F 30/13 |
| 2018/0096512 A1* | 4/2018 | Dahl | G06T 13/40 |
| 2018/0107726 A1* | 4/2018 | Dwivedi | G06F 16/26 |
| 2018/0137675 A1* | 5/2018 | Kwant | G06T 17/20 |
| 2018/0184000 A1* | 6/2018 | Lee | G03B 37/02 |
| 2018/0189014 A1* | 7/2018 | Patil | G06F 3/0416 |
| 2018/0192032 A1* | 7/2018 | Freeman | H04N 13/239 |
| 2018/0260661 A1* | 9/2018 | Konishi | G06K 9/6202 |
| 2018/0278918 A1* | 9/2018 | Peri | H04N 5/23238 |
| 2018/0284882 A1* | 10/2018 | Shipes | G06F 3/012 |
| 2018/0322683 A1* | 11/2018 | Dimitrov | G06T 15/205 |
| 2019/0073831 A1* | 3/2019 | Kim | G06F 3/011 |
| 2019/0073832 A1* | 3/2019 | Kim | G06F 40/221 |
| 2019/0096135 A1* | 3/2019 | Dal Mutto | G06T 7/50 |
| 2019/0098278 A1* | 3/2019 | Koizumi | H04N 13/282 |
| 2019/0102442 A1* | 4/2019 | Daga | G06F 16/258 |
| 2019/0102446 A1* | 4/2019 | Ramaiyer | G06F 16/2246 |
| 2019/0102447 A1* | 4/2019 | Ramaiyer | G06F 16/254 |
| 2019/0108396 A1* | 4/2019 | Dal Mutto | G06K 9/6267 |
| 2019/0139296 A1* | 5/2019 | Lakshman | G06T 15/08 |
| 2019/0187876 A1* | 6/2019 | Platt | G06F 3/0482 |
| 2019/0191146 A1* | 6/2019 | Koyama | G06K 9/00744 |
| 2019/0206280 A1* | 7/2019 | Palmer | G09B 5/125 |
| 2019/0236840 A1* | 8/2019 | Zuckerman | G06T 19/003 |
| 2019/0286086 A1* | 9/2019 | Gardner | G16H 20/60 |
| 2019/0332610 A1* | 10/2019 | Krishna | G06F 16/254 |
| 2019/0340306 A1* | 11/2019 | Harrison | G06N 5/04 |
| 2019/0370346 A1* | 12/2019 | Xu | G06F 16/447 |
| 2019/0371071 A1* | 12/2019 | Lyons | G06T 19/006 |
| 2019/0378341 A1* | 12/2019 | Xie | G06T 19/20 |
| 2019/0392069 A1* | 12/2019 | Lim | G06F 16/2455 |
| 2020/0007551 A1* | 1/2020 | Valente | H04L 63/104 |
| 2020/0012409 A1* | 1/2020 | Sadacharam | G06F 3/04815 |
| 2020/0020024 A1* | 1/2020 | Lyons | G06T 19/20 |
| 2020/0026592 A1* | 1/2020 | Ramaiyer | G06F 11/3409 |
| 2020/0054398 A1* | 2/2020 | Kovtun | G16H 40/63 |

(56) References Cited

U.S. PATENT DOCUMENTS

| | | | |
|---|---|---|---|
| 2020/0090030 A1* | 3/2020 | Huang | G06N 3/04 |
| 2020/0125550 A1* | 4/2020 | Katkade | G06F 16/2365 |
| 2020/0156363 A1* | 5/2020 | Touma | B29C 64/112 |
| 2020/0192906 A1* | 6/2020 | Visscher | G06F 16/903 |
| 2020/0230337 A1* | 7/2020 | Rees | G16H 20/40 |
| 2020/0242837 A1* | 7/2020 | Sato | G06T 17/205 |
| 2020/0257680 A1* | 8/2020 | Danyi | G06F 11/3409 |
| 2020/0267194 A1* | 8/2020 | Pilnock | G06F 9/452 |
| 2020/0286291 A1* | 9/2020 | Ebert | G06T 7/60 |
| 2020/0288111 A1* | 9/2020 | Sheng | H04N 13/167 |
| 2020/0357189 A1* | 11/2020 | Godzaridis | G01C 11/04 |
| 2020/0372697 A1* | 11/2020 | Mange | G06T 15/005 |
| 2020/0400954 A1* | 12/2020 | Tanaka | G06F 3/012 |
| 2020/0409531 A1* | 12/2020 | Nankani | G06F 3/04815 |
| 2020/0410745 A1* | 12/2020 | Matsunobu | G06T 9/00 |
| 2021/0049190 A1* | 2/2021 | Alberg | G06F 16/24556 |
| 2021/0081386 A1* | 3/2021 | Daga | G06K 9/6215 |
| 2021/0104066 A1* | 4/2021 | Haeusler | G06T 7/73 |
| 2021/0165552 A1* | 6/2021 | Revelsby | G06F 3/04842 |
| 2021/0191912 A1* | 6/2021 | Lakshminarayan | G06N 20/00 |
| 2021/0240735 A1* | 8/2021 | Roytman | G06F 16/283 |

* cited by examiner

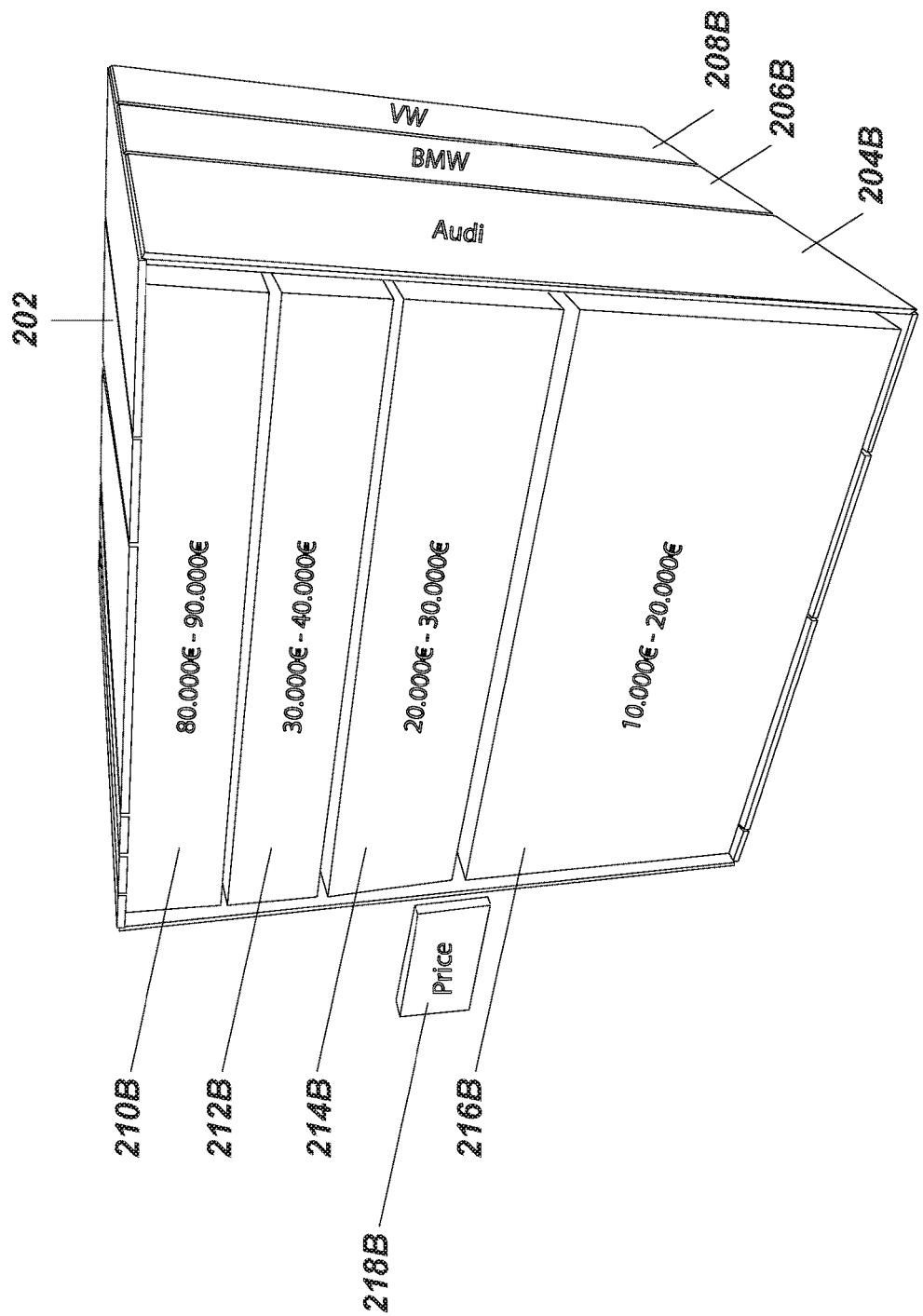

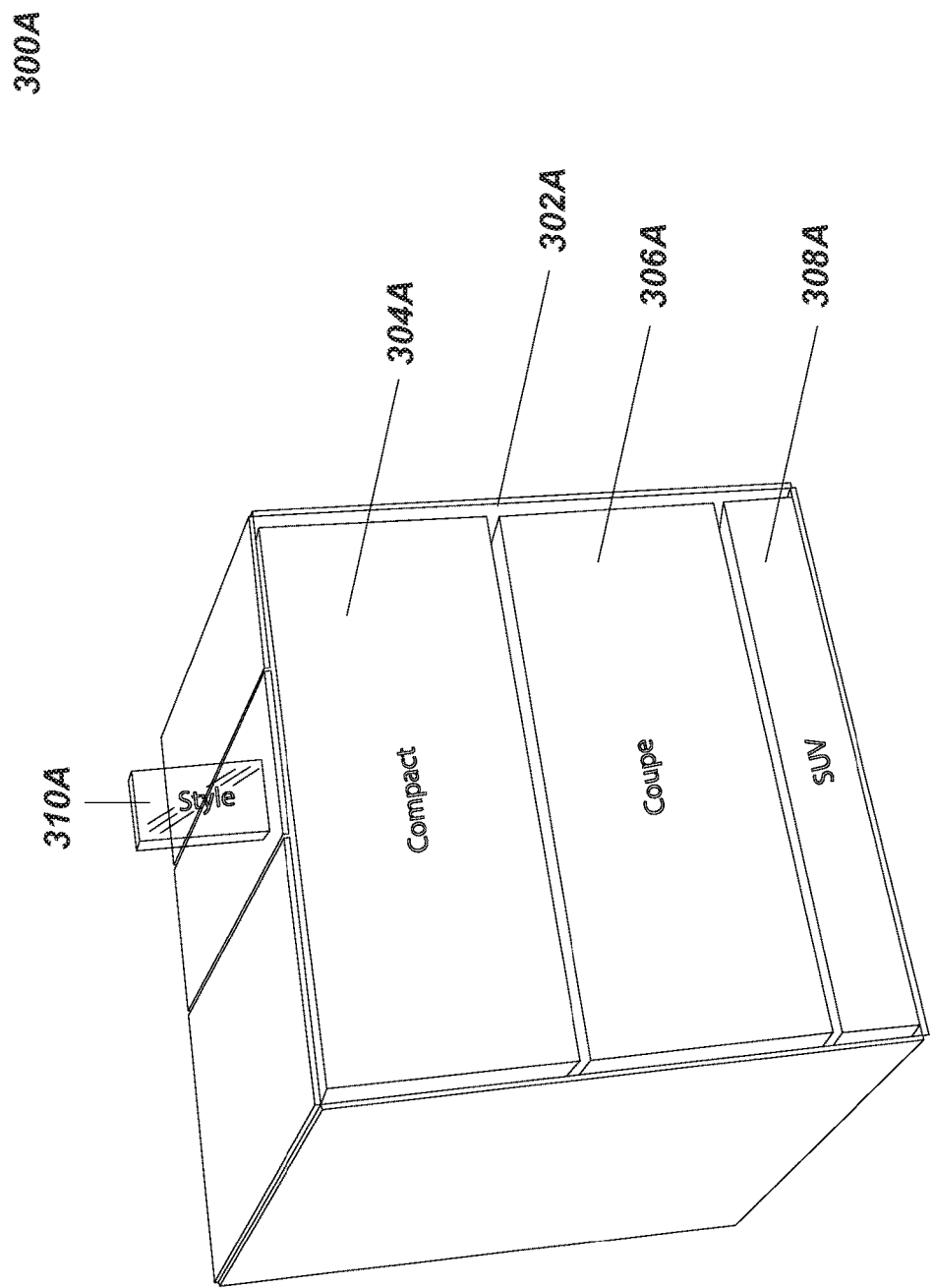

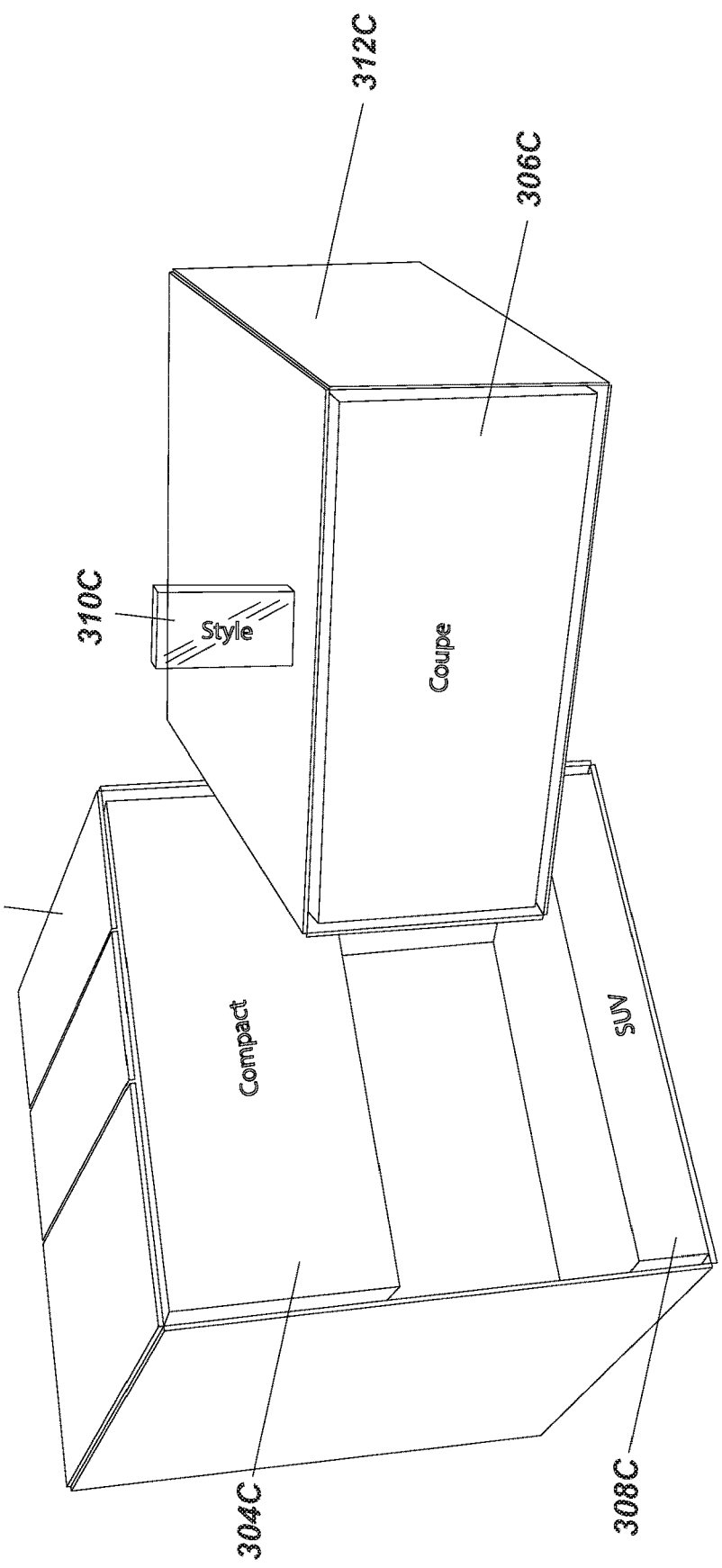

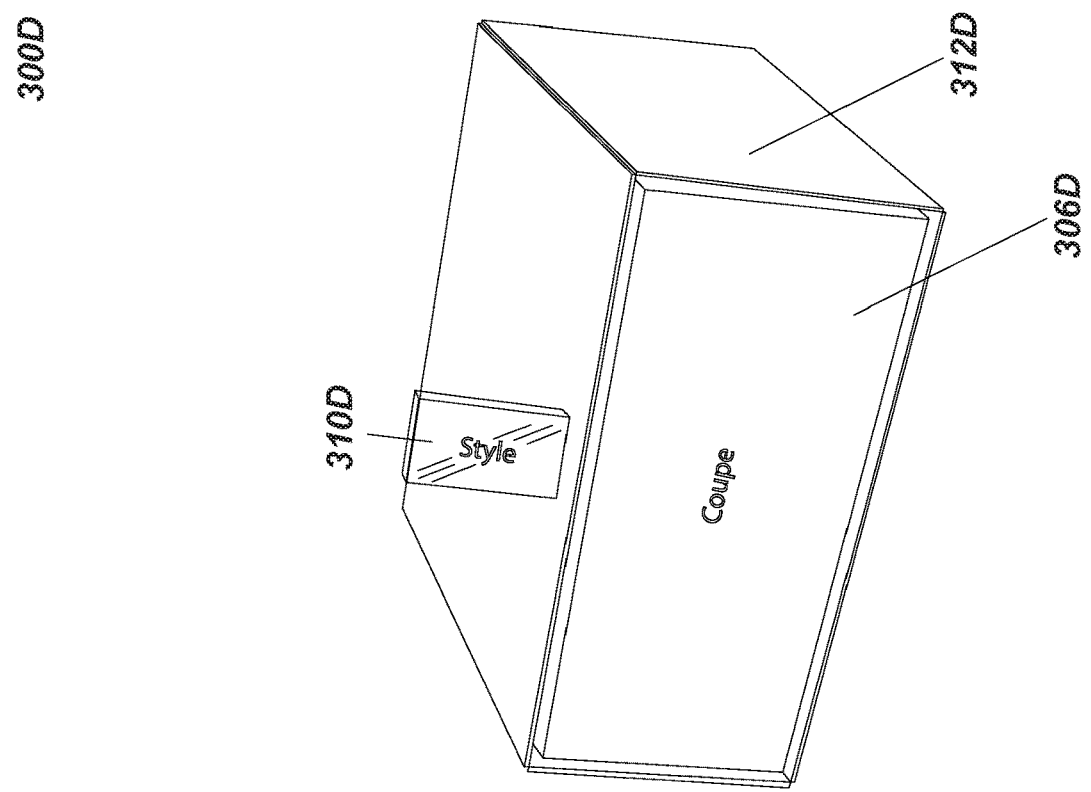
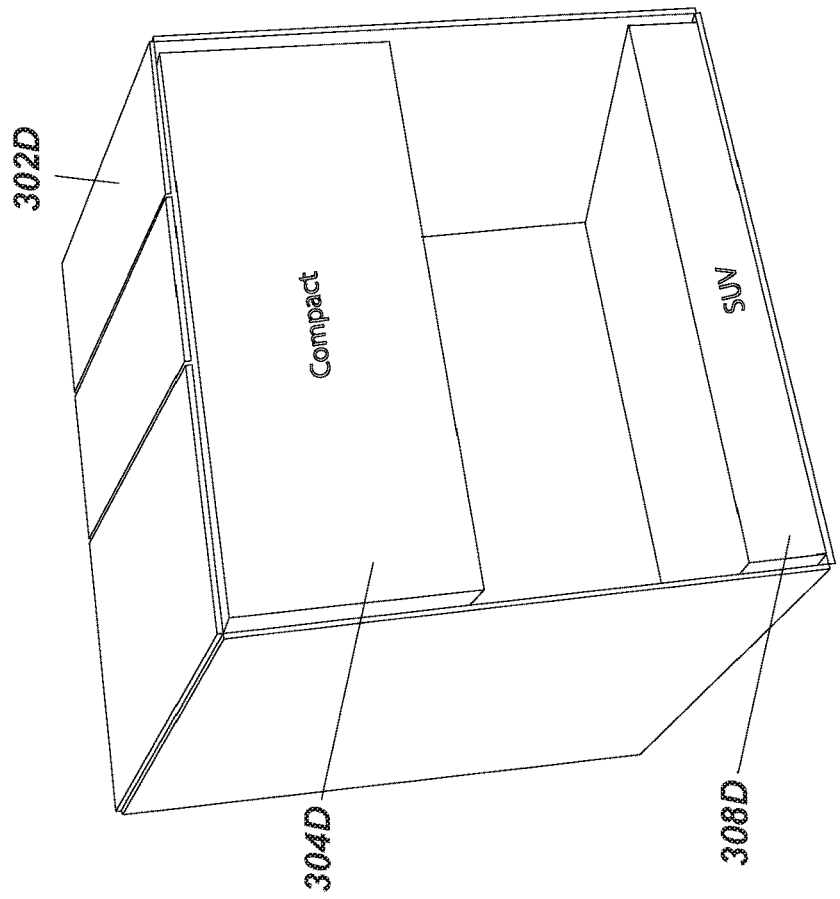
FIG. 3D

3D DATA EXPLORATION USING INTERACTIVE CUBOIDS

CROSS-REFERENCE TO RELATED APPLICATIONS

This application is related to U.S. Design Appl. Nos. 29/718,126, 29/718,127, and 29/718,129, which are incorporated herein by reference in their entireties.

BACKGROUND

When working with large datasets, such as business data, being able to easily visualize the information is necessary. Typically, approaches to interact with the data involve flat, table views of the data. In such views, individual records are generally shown as rows of a table, and the various fields of the records are shown as columns of the table.

In order to understand the data contained in the table, users may be able to search records through the use of an input field. For certain types of values, users may be able to use the input field to limit the displayed data to certain ranges of the values. By interacting with other parts of the table, such as column headings, users may be able to reorder the data based on the corresponding field for that column. Other user interface (UI) elements, like checkboxes, may also be applied to limit the data displayed in the table and aid in comprehension.

These traditional UI controls, while they ultimately allow users to see the data that matches their selection, may not provide an adequate understanding of what the data actually represents. And getting to the needed data selection in this manner may not be intuitive for many data sets.

In addition to viewing large tables, some presentation software packages can present data in graphical form such as pie charts, bar charts, line charts, etc. These applications can display data in a visual form, but they are limited in the dimensions in which data can be presented at one time. In addition, even when the data is presented in a potentially visually appealing manner, the ability to manipulate those visualizations is very limited and thus further limiting for the user to obtain a deeper understanding of the underlying data.

Accordingly, approaches are needed to improve the visualization and interactivity of large datasets.

BRIEF DESCRIPTION OF THE DRAWINGS

The accompanying drawings are incorporated herein and form a part of the specification.

FIGS. 2A and 2B illustrate a rotation interaction with a 3D representation, in accordance with an embodiment.

FIGS. 3A through 3D illustrate a filter interaction with a 3D representation, in accordance with an embodiment.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for visualizing and interacting with large datasets from a database.

When reviewing large datasets, such as business data, having access to unique ways of visualizing the data can help impart new understandings regarding the data. Business data in particular is typically visualized in two-dimensional (2D) representations of records (such as sales records). For example, a table or spreadsheet may be used to view sales information, with rows representing individual transaction records and columns representing various fields for the records. By way of non-limiting example, sales records could include fields relating to a price and a manufacturer.

In accordance with an embodiment, these datasets may be visualized in a three-dimensional (3D) representation that allows for the study and manipulation of the data. By way of non-limiting example, this 3D representation is a cuboid, but one skilled in the relevant arts will appreciate that the 3D representation may include any number of sides (e.g., any polyhedron shape), with a variety of height, width, and depth measures for each side as appropriate for presentation and interactivity purposes. In accordance with an exemplary embodiment discussed in further detail herein, the cuboid is specifically a cube.

In the 3D representation, each side corresponds to a 'dimension' of data—separate from the three-dimensionality of the representation itself, the 'dimensions' in this context represent fields of underlying data records. In the aforementioned sales record example, the price field would correspond to a first dimension, the manufacturer field would correspond to a second dimension, and so on.

Figure 1:
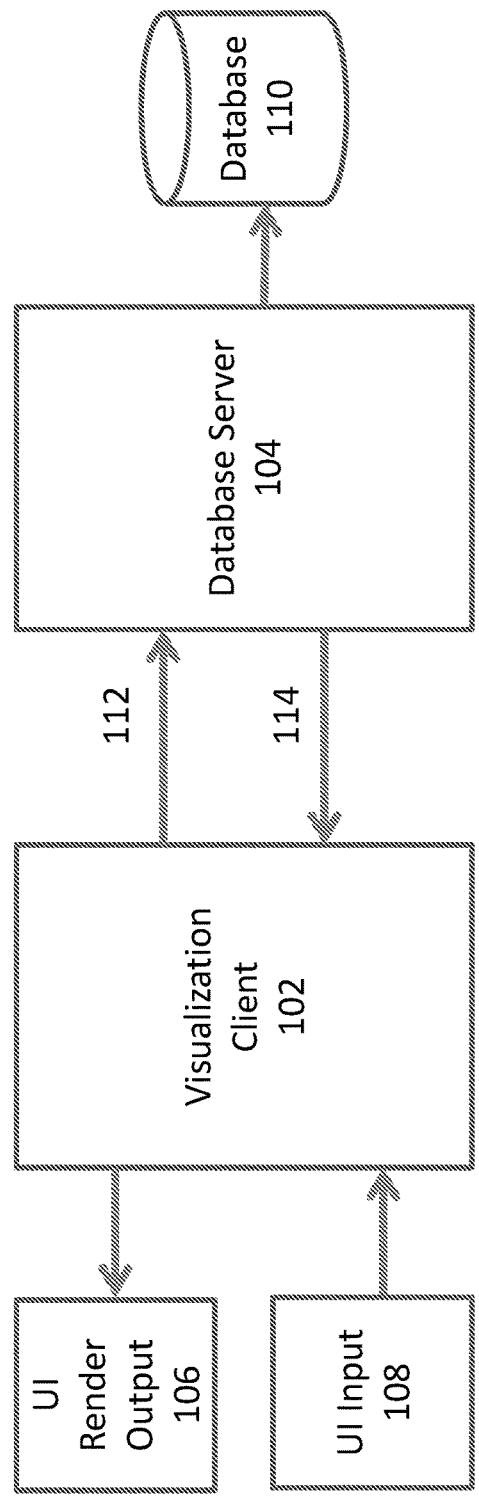
FIG. 1 illustrates a 3D data visualization system, in accordance with an embodiment.

FIG. 1 illustrates a 3D data visualization system 100, in accordance with an embodiment. The system includes a visualization client 102 in communication with a database server 104, which provides access to data within a database 110. Visualization client 102 is responsible for providing a user interface (UI) rendering 106 as output, and for adjusting the visualization of UI render output 106 based on UI input 108, in accordance with an embodiment. One skilled in the relevant arts will appreciate that the responsibilities of visualization client 102 may be handled by a single process, multiple processes, or any other combination of software modules, and is represented as in FIG. 1 by way of non-limiting example.

Visualization client 102 is able to send requests for data in request 112 to database server 104, and receive responses with the requested data in response 114. One skilled in the relevant arts will appreciate that database server 104 and database 110 need not be implemented strictly as databases (or even relational databases), and may instead be any storage structure permitting data retrieval in accordance with the requirements detailed herein.

As discussed in further detail below, UI input 108 may include any number of 2D or 3D UI input instructions. For example, UI input 108 may be provided by way of a 3D controller (e.g., an instruction to rotate a scene of UI render output 106 about an axis, an instruction to pan the scene, and so on). UI input 108 may also be provided by way of traditional 2D control mechanisms, such as a mouse and/or keyboard.

And as also discussed in further detail below, UI render output 106 is a 3D scene including the 3D representation (e.g., a cube) of the data. The 3D scene may be visualized in a number of different ways as would be appreciated by a person skilled in the relevant art. For example, a user of visualization client 102 may wear a virtual reality headset to view the 3D scene in a 3D manner. In another example, the 3D representation may be shown in an augmented reality (AR) representation, such as through the use of AR glasses, an AR app, or other AR display approaches. Or, in yet another example, the 3D representation may be shown on a flat 2D display, such as a standard computer monitor.

Figure 2A:
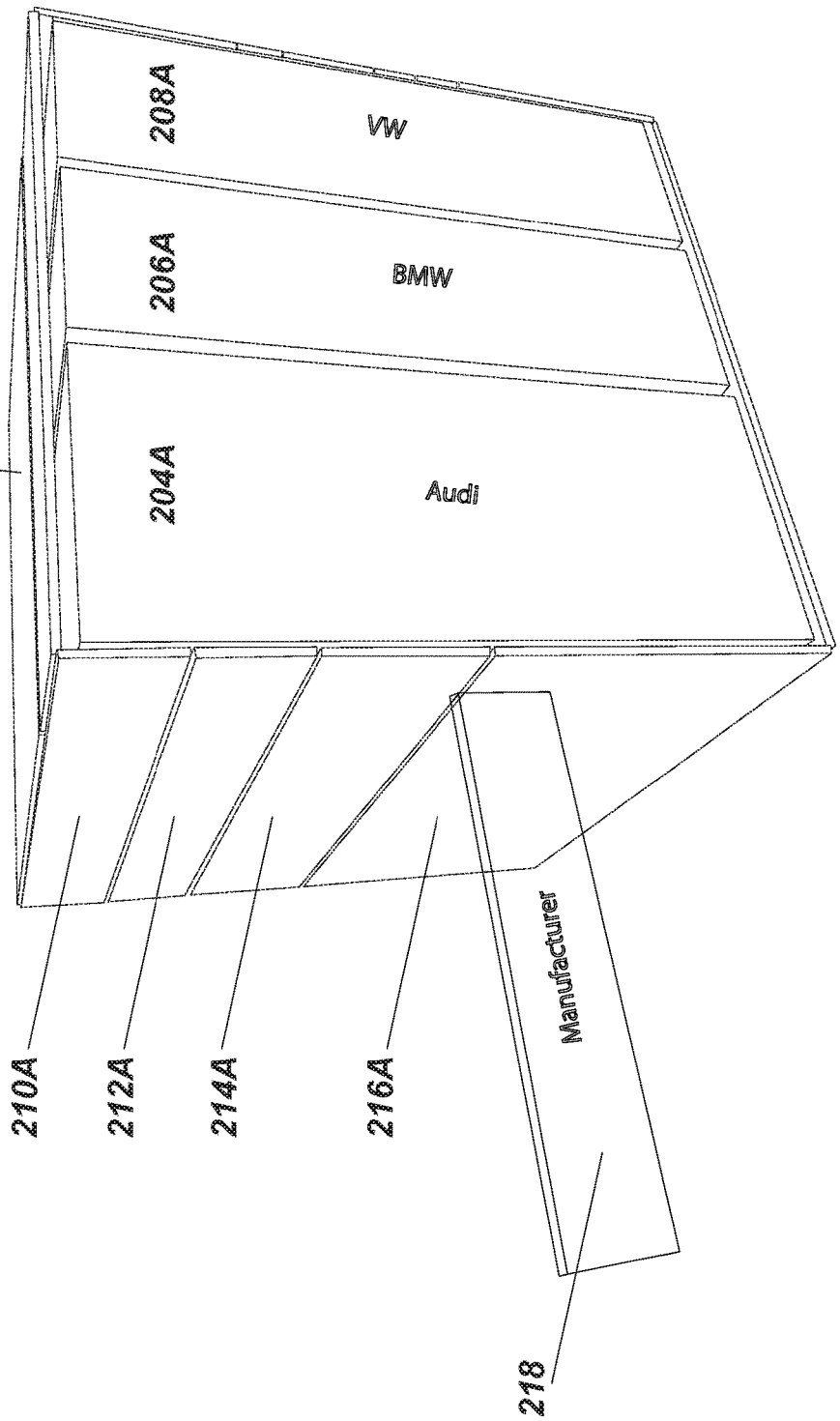

FIGS. 2A and 2B illustrate a rotation interaction with a 3D representation, in accordance with an embodiment. Throughout these figures, similar elements are shown with the same number, followed by a letter matching the letter of the current figure, for ease of understanding.

The 3D representation (the cube 202 shown in scenes 200A and 200B in this case) has multiple faces (or sides), each corresponding to a dimension of the underlying data records. For example, in the case of the vehicle business data depicted in scenes 200A and 200B, dimensions may include vehicle make, price, and model year. In the case of a cube, the ability to render multi-dimensional data on the faces of the cube allows for easy visualization and manipulation across six dimensions of data. For different numbers of dimensions, a shape other than a cuboid may be used. Further, the particular 3D representation may be selected on the basis of the number of needed dimensions (e.g., an eight- or twenty-sided shape). A dimension may be duplicated on several faces if desired, in particular in the event that there are fewer dimensions needed or available than there are faces to the 3D representation. Additionally, a face may be left blank if not needed.

A 3D scene is viewed from the perspective of one or more virtual cameras (referred to herein as simply a 'camera'), which determine how the scene is rendered and shown to a user (such as through UI render output 106 of FIG. 1). By way of non-limiting example, the scene includes cube 202, and may include additional objects or a background. In accordance with an embodiment, a face of the multiple faces that is closest to a camera is rendered to show multiple slices of data as "drawers"—3D representations of underlying records as divided within the dimension corresponding to the face closest to the camera, and nested within the overall 3D representation.

In this example, a user of visualization client 102 of FIG. 1 may interact with cube 202 in order to obtain a deeper, visual understanding of various available vehicles for sale. Cube 202 is rendered by UI render output 106 of FIG. 1 for display to a user, and may be manipulated by the user using UI input 108 of FIG. 1.

FIG. 2A in particular illustrates a scene 200A in which a cuboid (specifically, cube 202) has a primary face including drawers 204A, 206A, and 208A that is closest to the camera. The drawers of this primary face depict business data relating to a vehicle 'manufacturer' dimension, as shown in label 218A. Therefore, several vehicle manufacturers (e.g., 'Audi' 204A, 'BMW' 206A, and 'VW' 208A) are depicted as nested drawers (i.e., slices) within cube 202. Cube 202 has other faces, each corresponding to a dimension (e.g., price, model year). However, slices of data corresponding to those dimensions are rendered only the surface of those (secondary) faces of cube 202, in accordance with an embodiment. The face that is closest to the camera (the primary face), in an embodiment, is the only one depicted with "drawers".

In accordance with an embodiment, a label 218A may be shown in a position near or adjacent to the closest face of the 3D representation, such as cube 202. This label 218A may indicate a name for the dimension (e.g., 'manufacturer'). In an embodiment, only the label for the face closest to the camera is shown, although additional labels may be shown concurrently if desired. In addition, the location of the label 218A does not need to be at the left of the side closest to the virtual camera but could be displayed anywhere such as the bottom, top, or right edges of that face.

In accordance with a further embodiment, UI input 108 of FIG. 1 may detect an interaction with label 218A (e.g., a mouse click, or a grabbing action), and allow for movement of the entire cube 202 on the basis of this interaction. For example, a user may click on label 218A with a mouse and rotate cube 202 such that a different face of the multiple faces of cube 202 is closest to the camera.

When a new/different face of the 3D representation becomes the closest face to the camera, that new face takes on a similar representation to what is shown in scene 200A with respect to the 'style' dimension—slices of data within that new face are depicted as 3D 'drawers' nested within the 3D representation. All of the other faces (including any previously closest face) have their corresponding slices of data rendered only the surface of those faces of cube 202.

In FIGS. 2A and 2B, scene 200B shows cube 202 rotated such that pricing information on a secondary face of cube 202 in scene 200A (specifically, slices 210A, 212A, 214A, and 216A) become the new primary face. In scene 200B, former slices 210A, 212A, 214A, and 216A of a secondary face are now shown as drawers (210B, 212B, 214B, and 216B) within a primary face, together with label 218B indicating their dimension information (e.g., 'price'). Additionally, drawers 204A, 206A, and 208A of the former primary face in scene 200A are now shown as slices 204B, 206B, and 208B of a secondary face in scene 200B.

By way of non-limiting example, rendering drawers within the cube is accomplished by creating each slice within each face of the 3D representation as a separate 3D object. These slices are part of a 2D face of the 3D representation, and have no depth (or some limited depth selected to promote visibility, but without interfering with the depth of the drawers). When a face of the 3D representation becomes the closest face to a camera, the slices within that face are given depth—the slices become drawers. The depth may be, for example, equivalent to a size of the overall 3D representation in the same direction as the depth of the slice. Looking at scene 200A of FIG. 2A, drawers 204A, 206A, and 208A all have a width and a total height equivalent to the corresponding face of cube 202, but also have a depth that extends towards the back (away from the point of view) of cube 202, orthogonal to the 2D slice. In contrast, slices on the other faces of cube 202 (such as the left side face) have no or little depth, and are just shown as 2D slices, with a zero (or close to zero) size in a direction orthogonal to the 2D slice and serve as a surface of the cube (e.g., slices 210A, 212A, 214A, and 216A).

When cube 202 is rotated as shown in scene 200B, however, the former 2D slices become drawers (e.g., drawers 210B, 212B, 214B, and 216B) through the addition of depth as discussed above, while the former drawers become 2D slices (e.g., slices 204B, 206B, and 208B) by removing their depth.

Figure 3B:
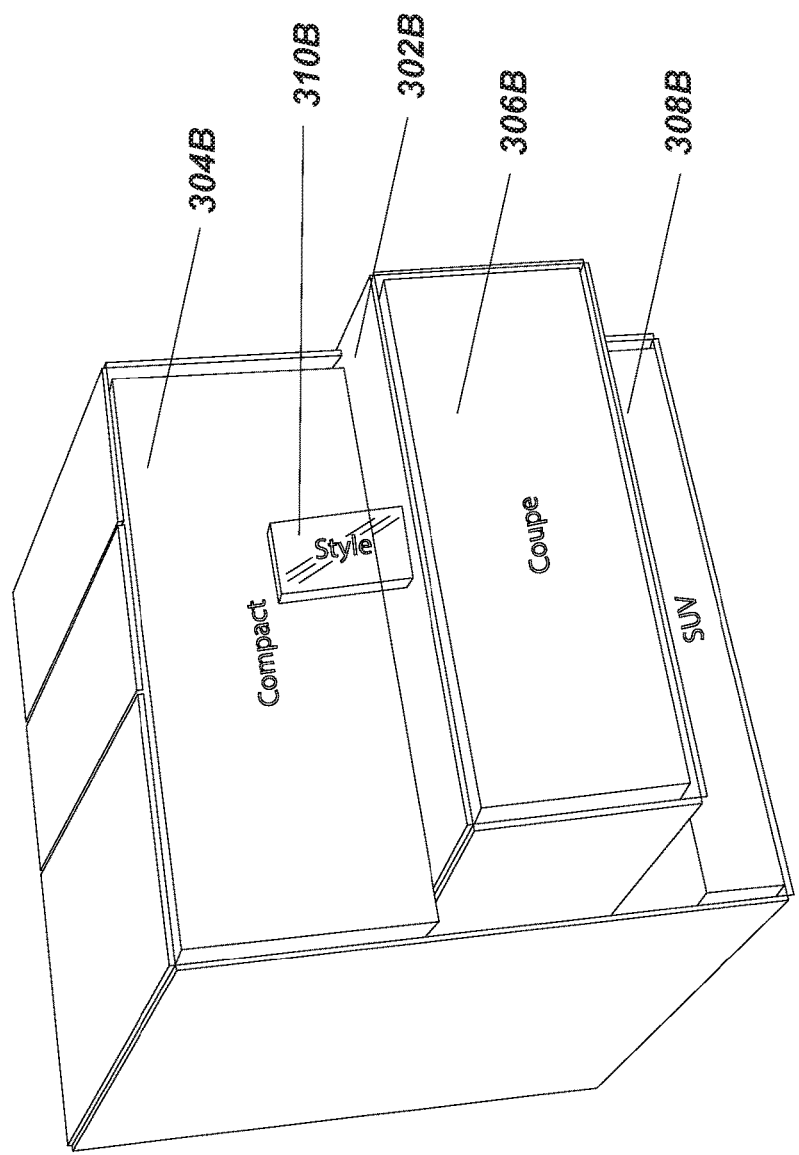

FIGS. 3A through 3D illustrate a filter interaction with the 3D representation, in accordance with an embodiment. FIG. 3A in particular illustrates a scene 300A having cube 302A. Cube 302A is shown in the exemplary illustration depicting business data relating to vehicles—specifically, vehicle styles—as a dimension.

For example, as shown in scene 300A, cube 302A has a face corresponding to the vehicle 'style' dimension closest to the camera. Therefore, several vehicle styles (e.g., 'compact' 304A, 'coupe' 306A, and 'SUV' 308A) are depicted as nested drawers (i.e., slices) within cube 302A. In accordance with an embodiment, a label 310A may be shown in a position near or adjacent to the closest face of the 3D representation, such as cube 302A.

FIG. 3B illustrates a scene 300B corresponding to scene 300A, with cube 302B corresponding to cube 302A. However, in scene 300B, a user of visualization client 102 of FIG. 1 has provided an input (via UI input 108 of FIG. 1) indicating an intent to 'grab' and interact with drawer 306B—the 'coupe' slice in the vehicle example shown. In accordance with an embodiment, this drawer 306B is removed as a separate 3D structure from cube 302B. In accordance with an embodiment, a label 310B is shown on drawer 306B during this interaction, and functions similarly to label 310A of FIG. 3A, but with respect to drawer 306B alone.

FIG. 3C illustrates a scene 300C in which drawer 306C has been entirely removed from within cube 302C. Drawer 306C is rendered as a separate cuboid 312C, in accordance with an embodiment, once it is removed from within cube 302C. FIG. 3D illustrates cuboid 312D, containing drawer 306D, entirely separate from cube 302D. In accordance with an embodiment, a visible gap is left between the drawers, such as drawer 306D, and cube 302D in order to promote visibility and separation of these elements from each other.

The animated sequence of FIGS. 3A-3D illustrate a 'filter' interaction with the underlying data represented by cube 302A-302D. For example, an underlying table of vehicle data (stored, for example, in database 110 of FIG. 1 and accessible through database server 104 of FIG. 1), may be structured as such:

| ID | Style | Price | Year |
|---|---|---|---|
| 0 | Coupe | $10,000 | 2016 |
| 1 | SUV | $20,000 | 2018 |
| ... | ... | ... | ... |
| N | ... | ... | ... |

In the above exemplary table, each record (shown on individual rows) corresponds to a particular vehicle (say, in a sales inventory). The columns—style, price, year—each correspond to a dimension of data populated in the individual records.

The filter interaction of FIGS. 3A-3D applies a filter to the dimension closest to the camera based on a drawer that is removed from the corresponding face of the 3D representation. Specifically, cube 302A as shown in scene 300A has drawers corresponding to the various styles present across vehicle records of the above exemplary table. In accordance with an embodiment, the height of each of these drawers may be sized proportionally based on a count of records matching various available elements of the corresponding dimension. For example, a total drawer height may be allocated proportionally to individual drawers based on a count of records where 'style' is 'compact', 'SUV', or 'coupe', to determine the heights of drawers 304A, 306A, and 308A, respectively.

This visual representation provides many advantages to an end user. First, in this example, six dimensions are easily visible to the end user by simply rotating cube 302A in FIG. 3A. Second, the relative sizes of categories, as represented by drawers 304A, 306A and 308A within all the dimensions can easily by scanned by rotating the cube 302A. As an example, by simply rotating cube 302A, the end user my learn that two categories in two different dimensions are not what was expected (e.g., the end user may quickly discern that the coupe drawer 306A has a smaller height than was expected and similarly the color red on a different face (not shown in FIGS. 3A-3D), may also have a smaller height than was expected. This gives the user the option of further filtering the underlying data by starting either with the coupe data (e.g., by extracting drawer 306A first) or extracting the red drawer on a different face first (not shown in FIGS. 3A-3D).

As shown in FIG. 3D, when drawer 306D is removed from cube 302D, drawer 306D is then depicted as its own cuboid 312D, in accordance with an embodiment. This is handled, in accordance with an embodiment, by providing each object (e.g., cube 302D, cuboid 312D, and any others) with their own queries on the underlying data of database 110 used to determine the applicable data for that object.

For example, initially cube 302A of FIG. 3A depicts all of the data of the underlying table in database 110. This underlying table may be a physical table, or may itself be the result table of a query. Regardless, the table underlying cube 302A is filtered by the operation of grabbing and removing the 'coupe' drawer 306A-D from cube 302A and placing it to the side. In the example shown, the resulting scene 300D of FIG. 3D has cuboid 312D built from limiting the underlying table to records where style='coupe' (and similarly cube 302D is rendered only from records where style !='coupe'). By way of non-limiting example, this filter may be applied as a query (such as a select statement). By way of further non-limiting example, the filter may be maintained as a table view (i.e., a virtual table). By way of yet an additional non-limiting example, the filtered data may be stored as a separate table, or other data store.

Cuboid 312D, being derived from cube 302D and the same underlying records, also has the same dimensions. For example, the label 310D attached to cuboid 312D is the same (e.g., 'style') as the label corresponding to the same dimension from cube 302D (e.g., label 310A in FIG. 3A). Rotating cuboid 312D results in the same dimensions elsewhere as with cube 302D. However, the contents of these other dimensions are limited in cuboid 312D based on the filter operation—price data, for example, in cuboid 312D will only be representative of prices for 'coupe' vehicles given the applied filter.

By way of non-limiting example, cuboid 312D is maintained as a non-cube cuboid corresponding to the dimensions of drawer 306D as it existed when part of cube 302D. This is done to avoid confusing a user—it is generally easier for a user to understand that cuboid 312D is derived from the filtered data of cube 302D if dimensions are maintained. However, one skilled in the relevant arts will appreciate that other approaches are equally viable, including automatically resizing cuboid 312D to be a cube. Similar approaches may be used for other polyhedron shapes.

In one embodiment, when a drawer like 306D is extracted from a cube 302D, the drawer 306D maintains its general shape when it is in the same view as the cube from which it was extracted. However, in this further embodiment, if the end user drags (translates) drawer 306D such that cube 302D is no longer in view, the processor may automatically resize drawer 306D into a cube. Similarly, having translated drawer 306D out of view of cube 302D, if the end user pans back to review cube 302D, the gap left by removing drawer 306D can be automatically filled be resizing drawers 304D and 308D. If the end user later translates either cube 302D or resized drawer 306D into the same view, the process will automatically open the gap shown in cube 302D and resize the cube drawer back into a non-cube prism drawer 306D as shown in FIG. 3D.

Figure 4A:
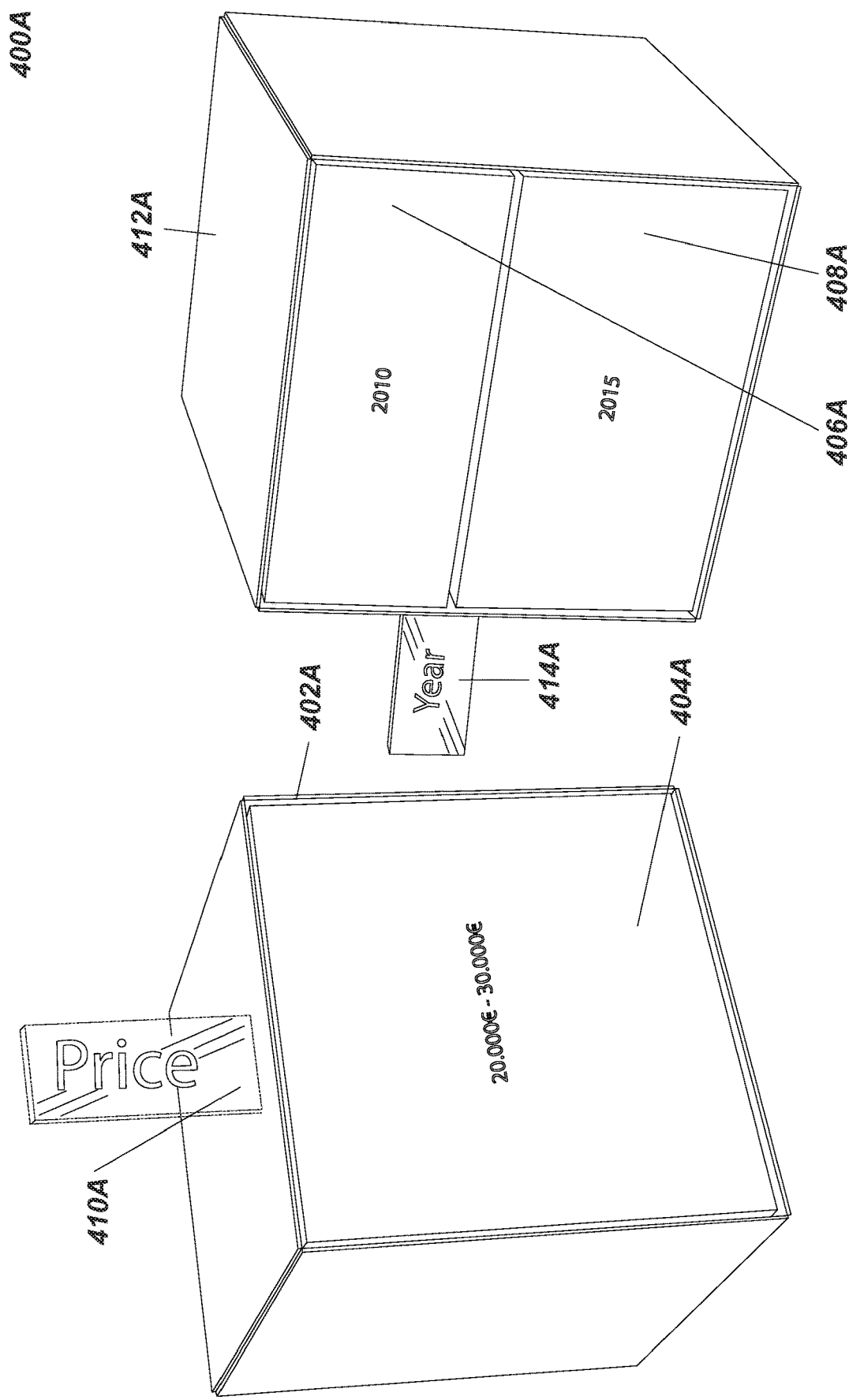
FIGS. 4A through 4C illustrate a merge interaction between two 3D representations, in accordance with an embodiment.
Figure 4B:
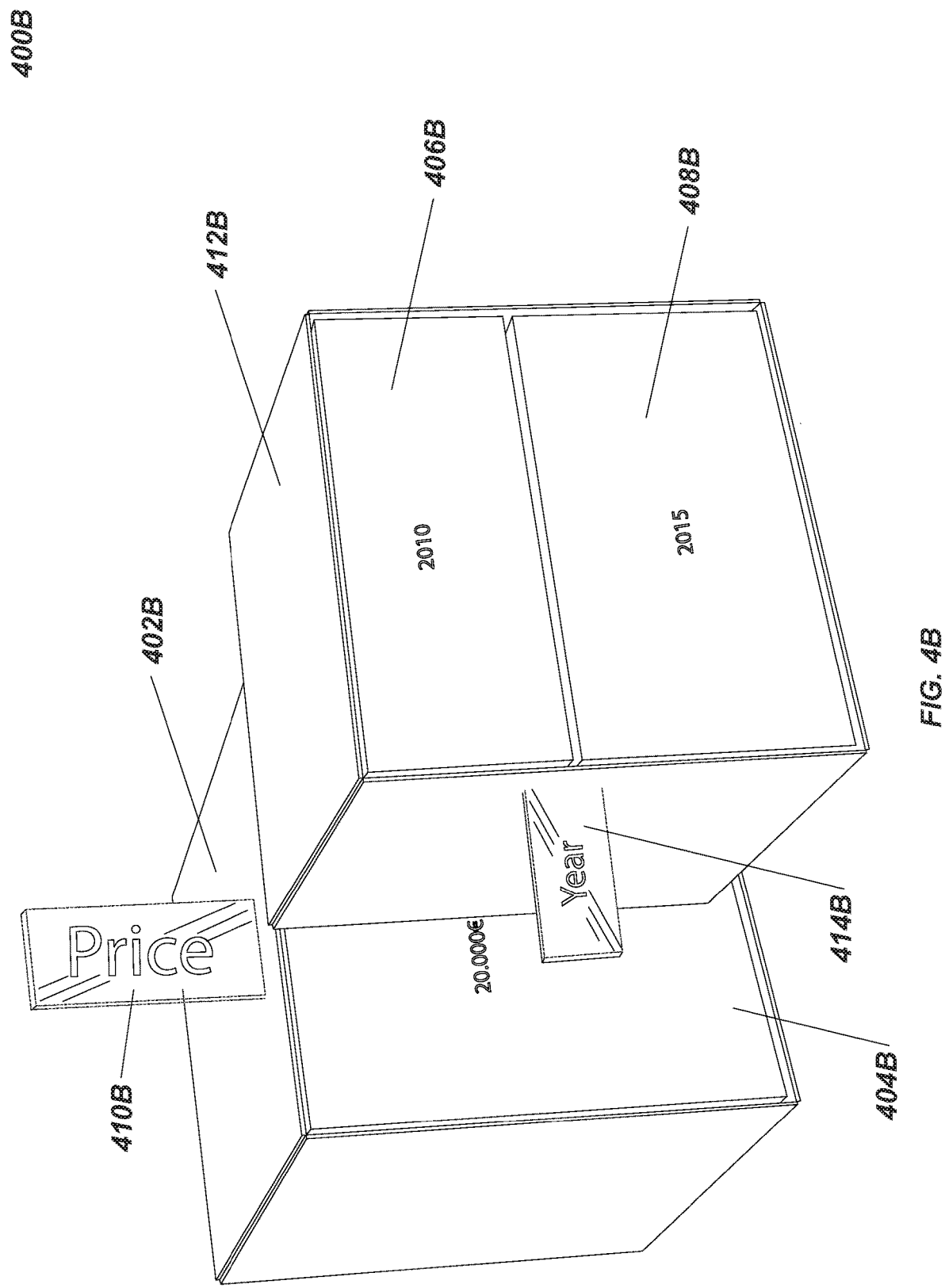
Figure 4C:
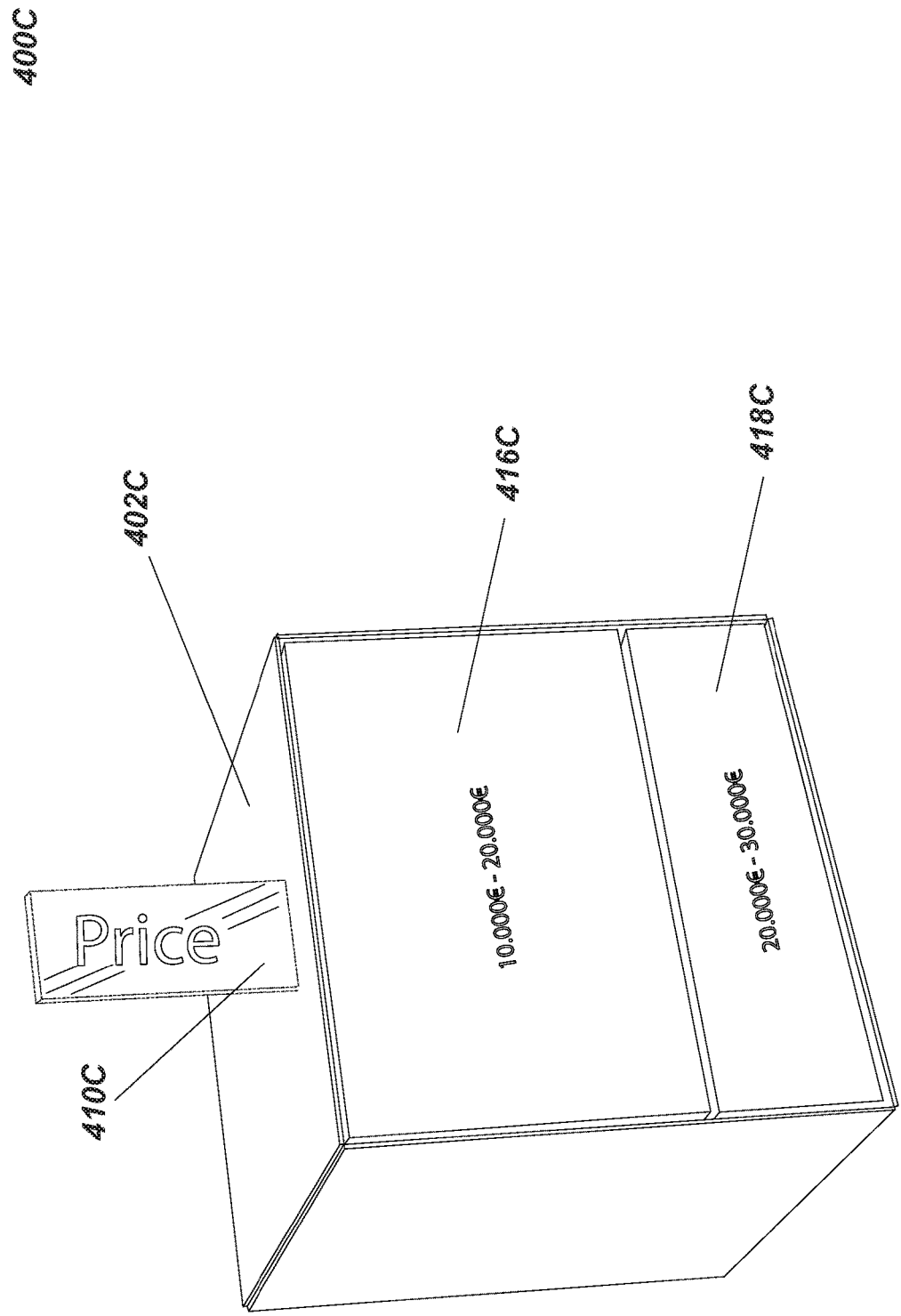

FIGS. 4A through 4C illustrate a merge interaction between two 3D representations, in accordance with an embodiment. Throughout these figures, similar elements are shown with the same number, followed by a letter matching the letter of the current figure, for ease of understanding. As shown in FIG. 4A, scene 400A illustrates two cubes 402A and 412A. Each cube 402A and 412A is generated from the same underlying dimensional data (e.g., two tables with equivalent columns, or from a same underlying table such as the exemplary table above), but filtered. Cube 402A, for example, shows a single price range on its price dimension (given by label 410A), as drawer 404A. The closest face of cube 412A shows its year dimension, given by label 414A, with two years presented as drawers 406A and 408A.

Even though different dimensions are depicted as the closest faces to the camera for cubes 402A and 412A, the underlying dimensions are the same. For example, both cubes are understood to have a matching table structure, with records corresponding to individual vehicles each having style, price, and model year dimensions. As a result, a unified table may be constructed by combining the records underlying cube 402A and cube 412A, with a new cube generated based on the full table.

FIG. 4B illustrates the merger process, in accordance with an embodiment. A user of visualization client 102 of FIG. 1 may interact with cube 412A in order to initiate a merge operation with cube 402A. By way of non-limiting example, this instruction may be sent to UI input 108 of FIG. 1 by grabbing label 414B corresponding to cube 412B and moving cube 412B over top of cube 402B. FIG. 4C illustrates a scene 400C with merged cube 402C—cube 402C is generated using all of the records combined from the underlying data of cube 402A and cube 412A.

Figure 5A:
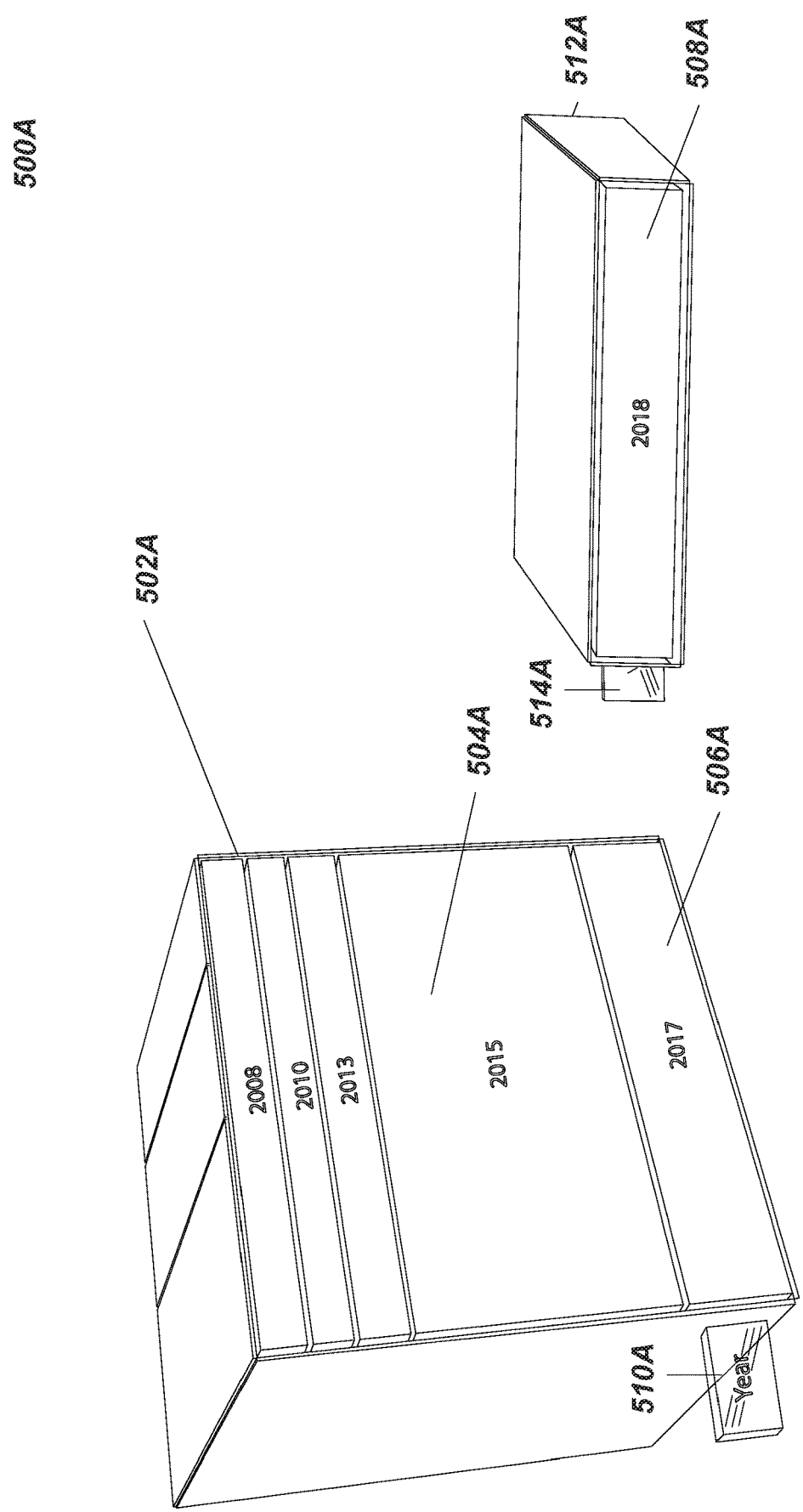
FIGS. 5A through 5D illustrate a filter and merge interaction between two 3D representations, in accordance with an embodiment.

FIGS. 5A through 5D illustrate a filter and merge interaction between two 3D representations, in accordance with an embodiment. Throughout these figures, similar elements are shown with the same number, followed by a letter matching the letter of the current figure, for ease of understanding. FIG. 5A depicts a scene 500A with two 3D representations—cube 502A and cuboid 512A—in accordance with an embodiment. By way of non-limiting example, cuboid 512A may be created from cube 502A by the filtering process discussed above with respect to FIGS. 3A-3D, or may be rendered from its own separate table. Additionally, cuboid 512A may retain its proportions from its creation from cube 502A (e.g., a non-cube prism, as shown in FIG. 5A), or may be resized and reshaped into a cube or other cuboid, in accordance with embodiments. Regardless, both cube 502A and cuboid 512A are constructed from underlying data having the same dimensions (e.g., two tables having the same columns).

Figure 5B:
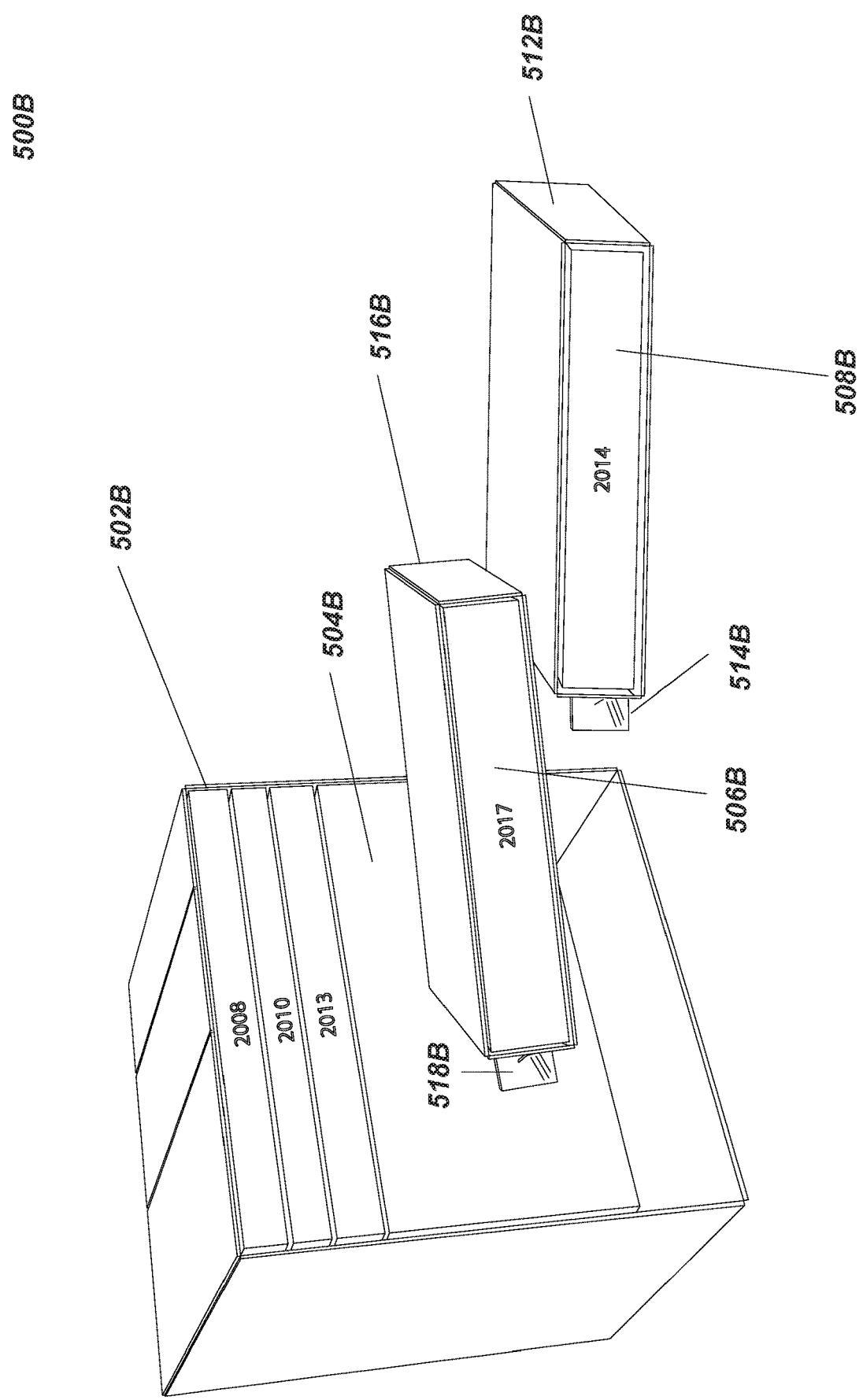
Figure 5C:
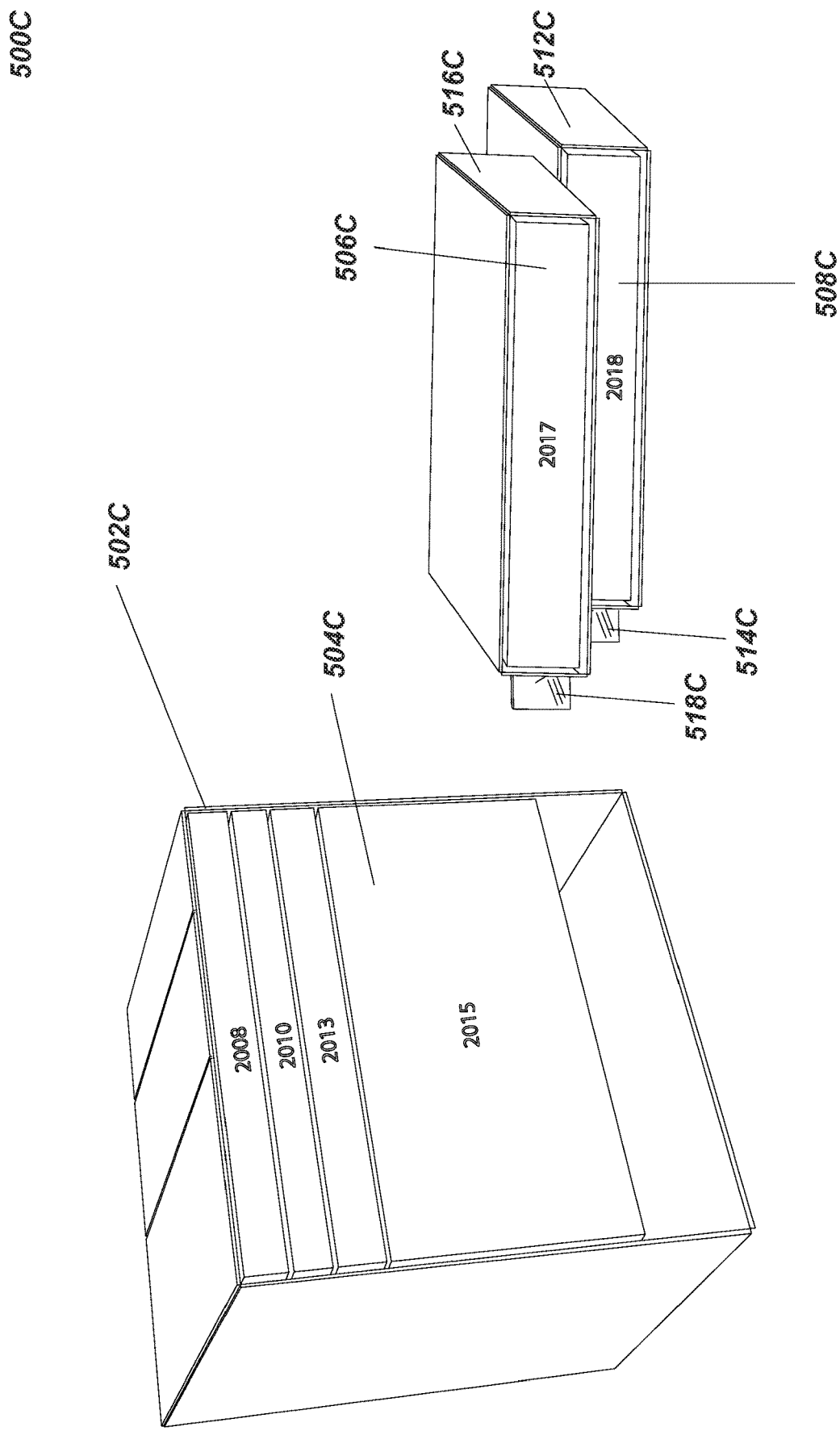
Figure 5D:
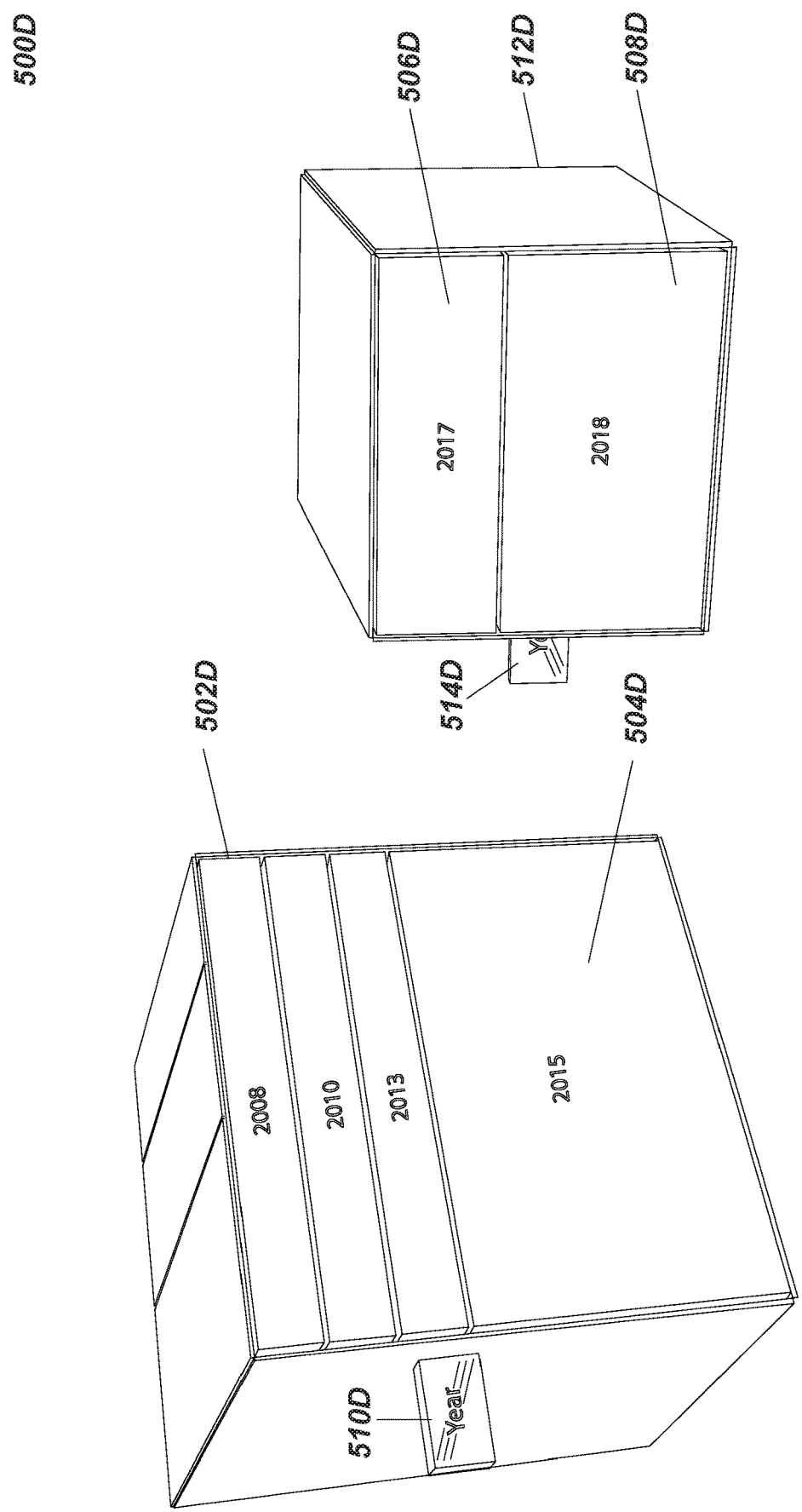

FIG. 5B illustrates a filter operation consistent with FIGS. 3A-3D, in which a user grabs a drawer from cube 502B (e.g., model year '2017' slice, depicted as drawer 506B, generated as cuboid 516B once separated from cube 502B). However, in this case, the user may move the drawer 506B (as cuboid 516B with label 518B) over top of cuboid 512B to merge the two sets of underlying records. FIG. 5C shows scene 500C in which cuboid 516C is laid over top of cuboid 512C, and FIG. 5D shows the two cuboids merged into a single cube 512D. As before, this merger is accomplished by combining the records underlying the two cuboids, to generate cube 512D from the single, combined set of records (e.g., as a physical table, a view, a query, etc.). While this resizing and reshaping of the two cuboids into a single cube 512D may improve visibility, it is not a requirement that the combined two cuboids be resized or reshaped into a cube, and such implementation is provided by way of non-limiting example.

Figure 6:
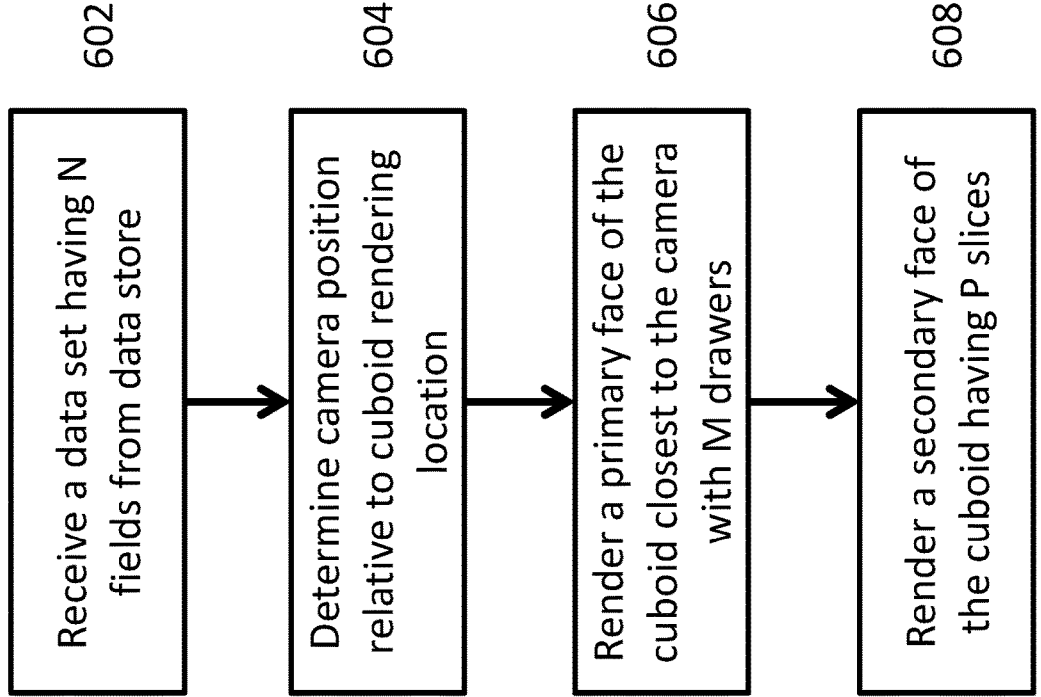
FIG. 6 is a flowchart illustrating steps by which a 3D representation is rendered, in accordance with an embodiment.

FIG. 6 is a flowchart 600 illustrating steps by which a 3D representation is rendered, in accordance with an embodiment. The process begins at step 602 where a data set having N fields is received from a data store. For example, a vehicle data set stored in a database may have fields relating to vehicle make, model, price, manufacturer, etc. These N fields are each treated as dimensions, as previously discussed.

At step 604, a position of a camera within a scene is determined, relative to where the 3D representation (e.g., a cuboid) is being rendered. By making this determination, it is possible at step 606 to render a primary face of the cuboid, defined as the face that is closest to the camera. The primary face is rendered with M slices, but these slices are represented as drawers. The number of drawers M to render may be determined by however many distinct elements are present within the dimension corresponding to the primary face (e.g., for manufacturers, as many unique manufacturers as are present in the underlying data). In an additional embodiment, the number of drawers M may be selected according to algorithms that group underlying elements (e.g., price ranges). One skilled in the art will recognize that any approach to group or restrict the elements selected for association with the M drawers may be used, and is not limited to the foregoing approaches.

At step 608, a secondary face of the cuboid is rendered, in accordance with an embodiment. This secondary face has P slices, again corresponding to the number of underlying elements (by the same process above for slicing the M drawers). Step 608 may be repeated for additional secondary faces as needed.

Figure 7:
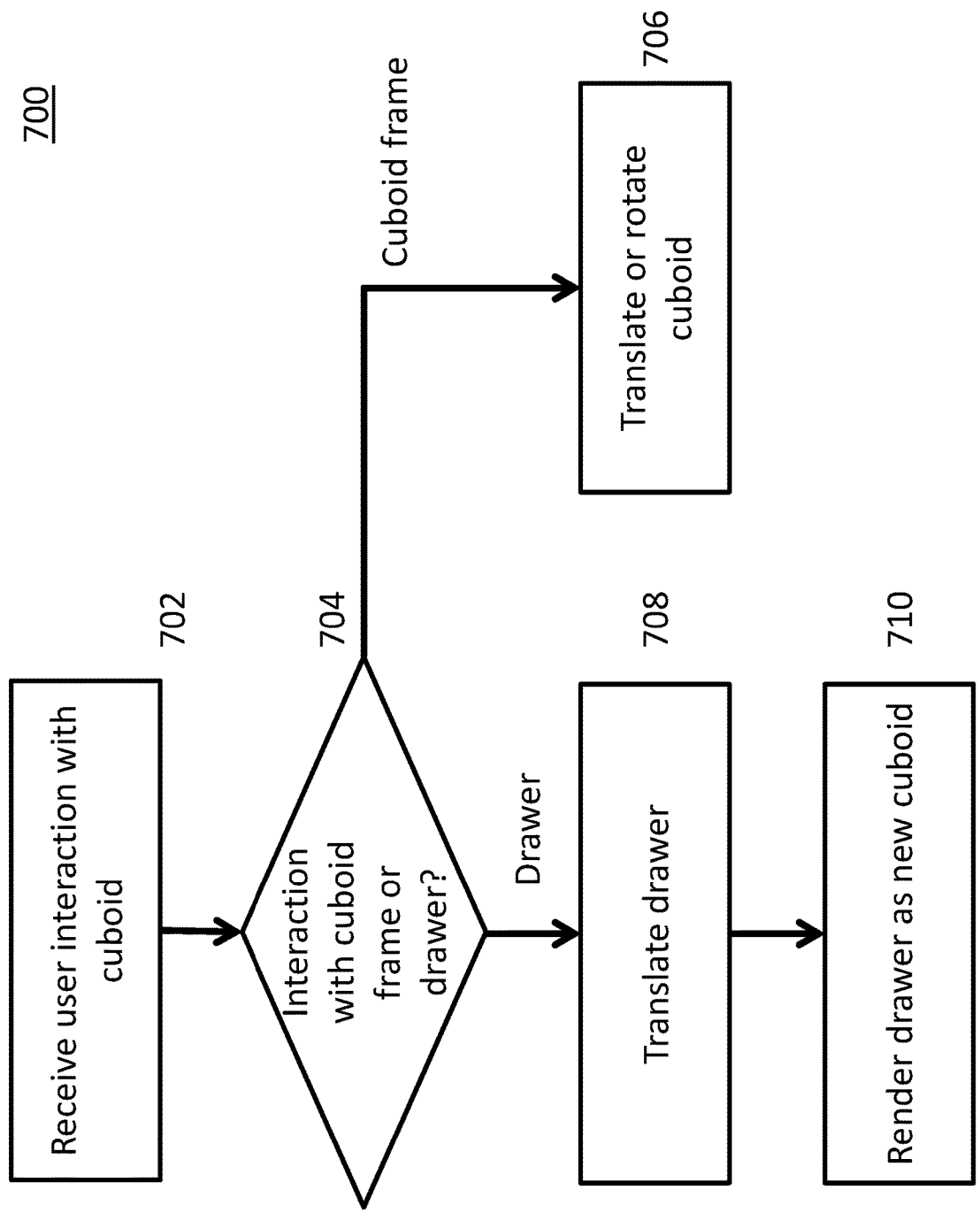
FIG. 7 is a flowchart illustrating steps for handling user interaction with the 3D representation, in accordance with an embodiment.

FIG. 7 is a flowchart 700 illustrating steps for handling user interaction with the 3D representation, in accordance with an embodiment. The process begins at step 702 where a user interaction with the 3D representation (e.g., a cuboid) is received. In accordance with an embodiment, this interaction may be a mouse click, or a grabbing action or gesture made with a VR or AR input device, or other interactions as would be understood by a person skilled in the relevant art.

At step 704, a determination is made as to whether the interaction is being made with respect to a drawer of the cuboid, or a frame of the cuboid (e.g., anything other than the drawer). This decision point determines whether the interaction is resolved with respect to the drawer or the cuboid as a whole. One skilled in the relevant art will appreciate that other decisions may be used to determine whether the interaction is intended to be with respect to a drawer or the cuboid as a whole, and this particular decision is provided by way of non-limiting example.

If the interaction is with respect to the drawer, then the process proceeds to step 708 where the drawer is translated within the scene depicting the cuboid, in accordance with an embodiment. This translation may be given by the interaction in a number of different ways, such as a click-drag-and-drop interaction or similar, by way of non-limiting example. At step 710, the drawer is rendered as a new cuboid at the translated location within the scene. In accordance with an embodiment, the original cuboid may be re-rendered without the removed drawer.

If the interaction is with respect to the cuboid frame, then the process proceeds to step 706 where the cuboid is translated or rotated within the scene. The translation may be given by the interaction in a number of different ways, such as a click-drag-and-drop interaction or similar, by way of non-limiting example.

Figure 8:
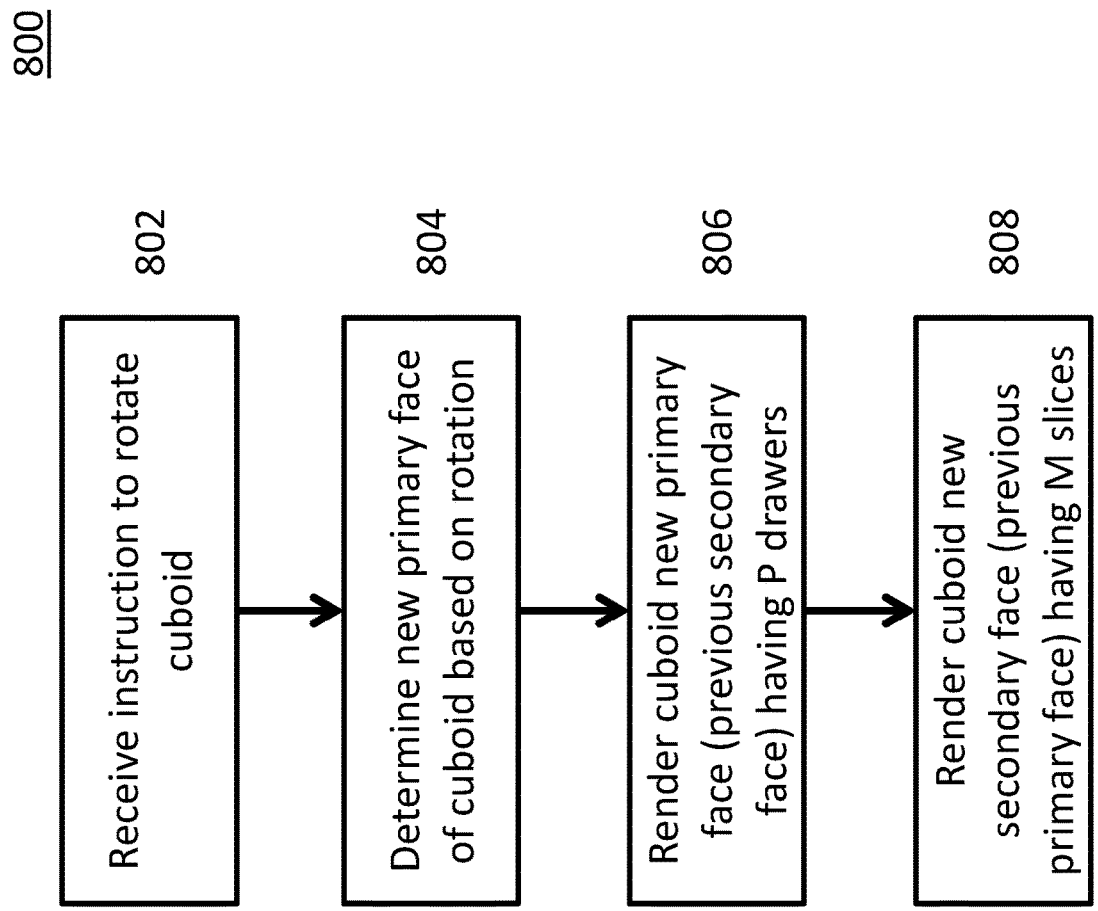
FIG. 8 is a flowchart illustrating steps for rotating a 3D representation, in accordance with an embodiment.

FIG. 8 is a flowchart 800 illustrating steps for rotating a 3D representation, in accordance with an embodiment. The process begins at step 802 where an instruction to rotate the 3D representation (e.g., a cuboid) is received. This instruction may be received in accordance with the determinations discussed above leading to step 706 of FIG. 7.

To understand the remaining steps, the rotation is described further in view of the initial rendering steps of flowchart 600 of FIG. 6, which rendered the primary face with M drawers and the secondary face with P slices as discussed above. Based on the rotation, a new primary face of the cuboid may be determined at step 804. Assuming this new primary face is the former secondary face with P slices from flowchart 600, then at step 806 the new primary face is rendered with P drawers. Similarly, at step 808, the new secondary face (the previous primary face with M drawers) is rendered with M slices.

A detailed non-limiting example of the appearance of such rotation is provided above with respect to FIGS. 2A and 2B.

Figure 9:
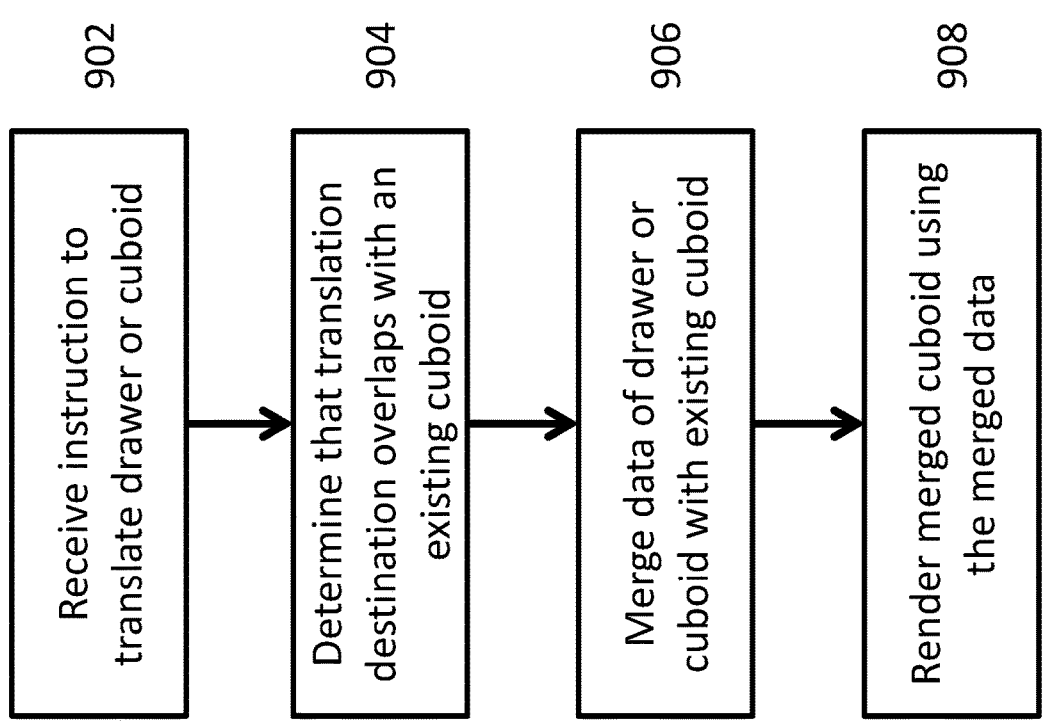
FIG. 9 is a flowchart illustrating steps for translating a 3D representation, in accordance with an embodiment.

FIG. 9 is a flowchart 900 illustrating steps for translating a 3D representation, in accordance with an embodiment. The process begins at step 902 where an instruction to translate the 3D representation (e.g., a cuboid or a drawer) is received. This instruction may be received in accordance with the determinations discussed above leading to steps 708 and 710 of FIG. 7. In this exemplary embodiment, however, a determination is made at step 904 that the translation destination overlaps with an existing cuboid within the scene. Based on this determination, underlying data corresponding to the translated cuboid or drawer is merged with underlying data of the existing cuboid at step 906, such that at step 908 a merged cuboid using the merged data is rendered.

Figure 10:
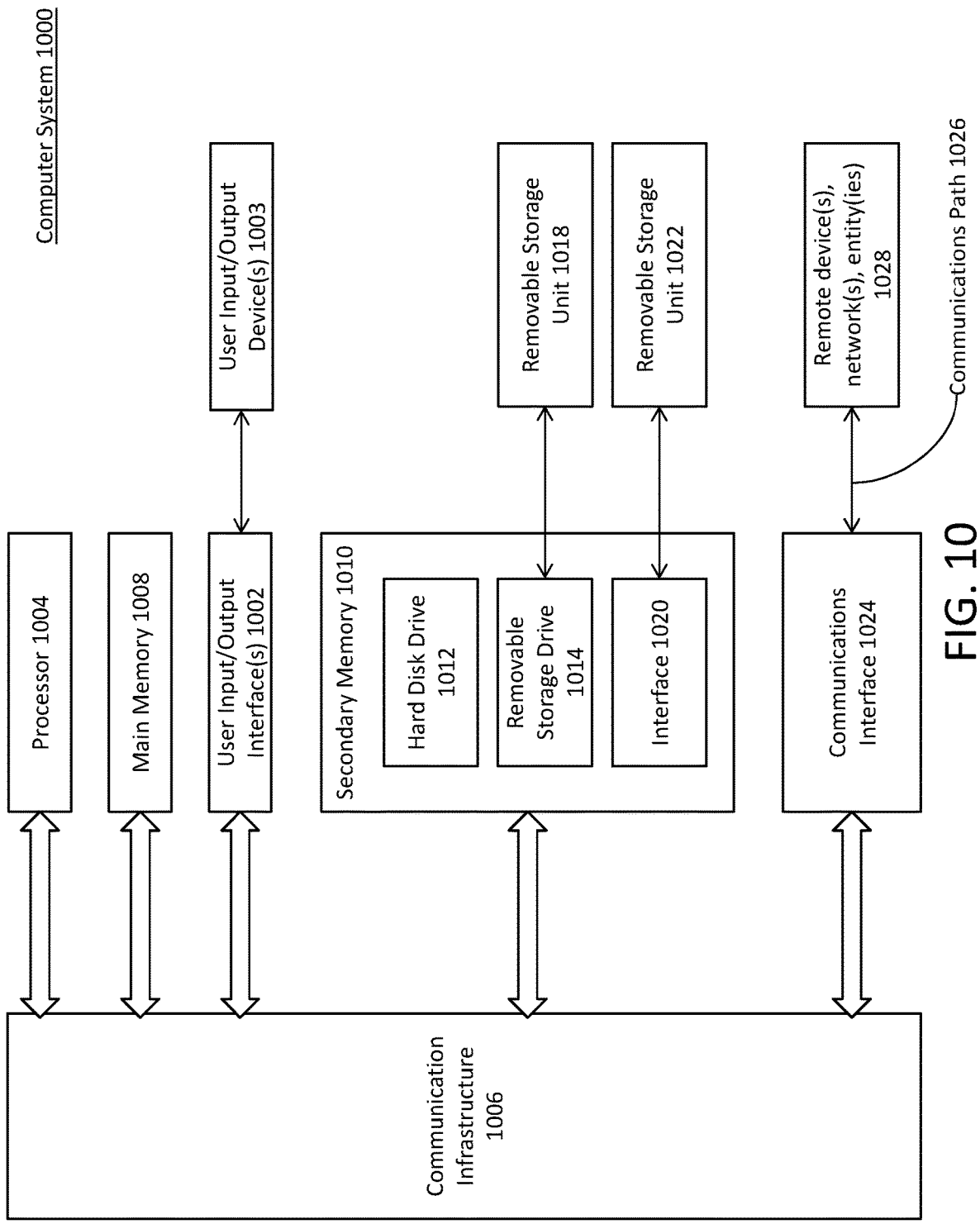
FIG. 10 is an example computer system useful for implementing various embodiments.

Various embodiments may be implemented, for example, using one or more well-known computer systems, such as computer system 1000 shown in FIG. 10. One or more computer systems 1000 may be used, for example, to implement any of the embodiments discussed herein, as well as combinations and sub-combinations thereof.

Computer system 1000 may include one or more processors (also called central processing units, or CPUs), such as a processor 1004. Processor 1004 may be connected to a communication infrastructure or bus 1006.

Computer system 1000 may also include user input/output device(s) 1003, such as monitors, keyboards, pointing devices, etc., which may communicate with communication infrastructure 1006 through user input/output interface(s) 1002.

One or more of processors 1004 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 may also include a main or primary memory 1008, such as random access memory (RAM). Main memory 1008 may include one or more levels of cache. Main memory 1008 may have stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 may include a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 may read from and/or write to removable storage unit 1018.

Secondary memory 1010 may include other means, devices, components, instrumentalities or other approaches for allowing computer programs and/or other instructions and/or data to be accessed by computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system 1000 to communicate with external or remote devices 1028 over communications path 1026, which may be wired and/or wireless (or a combination thereof), and which may include any combination of LANs, WANs, the Internet, etc. Control logic and/or data may be transmitted to and from computer system 1000 via communication path 1026.

Computer system 1000 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1000 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:

rendering, by one or more computing devices, first multi-dimensional data in a first polyhedron, wherein a first face of the first polyhedron determined to be closest in distance to a camera is depicted as a plurality of independently removable slices corresponding to respective one or more data values of a dimension of the multi-dimensional data;

receiving, by the one or more computing devices, a command to remove a first slice of the plurality of slices from the rendered first polyhedron responsive to a UI input interaction with the depiction of the first slice;

performing, by the one or more computing devices, a filter operation on each of the dimensions of the first multi-dimensional data responsive to the command to remove the first slice using the respective one or more data values corresponding to the first slice to produce second multi-dimensional data that is a subset of the first multi-dimensional data;

rendering, by the one or more computing devices, the first slice as a second polyhedron separate from the first polyhedron, wherein an appearance of the second polyhedron is based on the second multi-dimensional data;

receiving, by the one or more computing devices, a UI input interaction of a command to remove a second slice of the plurality of slices from the first polyhedron and to place the second slice in the second polyhedron;

performing, by the one or more computing devices, a filter operation on each of the dimensions of the first multi-dimensional data responsive to the command to remove the second slice using the respective one or more data values corresponding to the second slice to produce third multi-dimensional data that is a subset of the first multi-dimensional data;

merging, by the one or more computing devices, the third multi-dimensional data with the second multi-dimensional data based on the command to place the second slice in the second polyhedron; and rendering, by the one or more computing devices, the second polyhedron, wherein the appearance of the second polyhedron is based on the second multi-dimensional data merged with the third multi-dimensional data.

2. The computer implemented method of claim 1, wherein performing the filter operation comprises:
generating, by the one or more computing devices, a query to select records of the first multi-dimensional data matching the respective one or more data values corresponding to the first slice.

3. The computer implemented method of claim 2, wherein performing the filter operation further comprises:
generating, by the one or more computing devices, the second multi-dimensional data as a view representation of the first multi-dimensional data based on the query.

4. The computer implemented method of claim 1, further comprising:
rendering, by the one or more computing devices, the plurality of slices of the first face of the first polyhedron determined to be closest in distance to the camera with a depth corresponding to a depth of the first polyhedron in a direction orthogonal to the plurality of slices.

5. The computer implemented method of claim 4, further comprising:
rotating, by the one or more computing devices, the first polyhedron based on a rotation command;
determining, by the one or more computing devices, that a second face of the first polyhedron is closest in distance to the camera;
rendering, by the one or more computing devices, the plurality of slices of the first face of the first polyhedron with depth corresponding to a surface of the polyhedron; and
rendering, by the one or more computing devices, a plurality of slices of the second face of the first polyhedron with a depth corresponding to a depth of the first polyhedron in a direction orthogonal to the plurality of slices of the second face.

6. The computer implemented method of claim 1, wherein each slice, in a subset of the plurality slices, includes two or more data values, and wherein a rendered size of each of the plurality of slices in the rendering is proportional to a count of how many data values are included in each respective slice.

7. The computer implemented method of claim 1, wherein each dimension of the first polyhedron corresponds to a field of data from a database, and wherein both the first polyhedron and the second polyhedron include an equivalent number of dimensions in the rendering the first slice as the second polyhedron.

8. The computer implemented method of claim 7, wherein the first polyhedron and the second polyhedron include six or more dimensions of data.

9. A system, comprising:
a memory configured to store operations; and
one or more processors configured to perform the operations, the operations comprising:
rendering, by one or more computing devices, first multi-dimensional data in a first polyhedron, wherein a first face of the first polyhedron determined to be closest in distance to a camera is depicted as a plurality of independently removable slices corresponding to respective one or more data values of a dimension of the multi dimensional data;
receiving, by the one or more computing devices, a command to remove a first slice of the plurality of slices from the rendered first polyhedron responsive to a UI input interaction with the depiction of the first slice;
performing, by the one or more computing devices, a filter operation on each of the dimensions of the first multi-dimensional data responsive to the command to remove the first slice using the respective one or more data values corresponding to the first slice to produce second multi-dimensional data that is a subset of the first multi-dimensional data;
rendering, by the one or more computing devices, the first slice as a second polyhedron separate from the first polyhedron, wherein an appearance of the second polyhedron is based on the second multi-dimensional data;
receiving, by the one or more computing devices, a UI input interaction of a command to remove a second slice of the plurality of slices from the first polyhedron and to place the second slice in the second polyhedron;
performing, by the one or more computing devices, a filter operation on each of the dimensions of the first multi-dimensional data responsive to the command to remove the second slice using the respective one or more data values corresponding to the second slice to produce third multi-dimensional data that is a subset of the first multi-dimensional data;
merging, by the one or more computing devices, the third multi-dimensional data with the second multi-dimensional data based on the command to place the second slice in the second polyhedron; and
rendering, by the one or more computing devices, the second polyhedron, wherein the appearance of the second polyhedron is based on the second multi-dimensional data merged with the third multi-dimensional data.

10. The system of claim 9, wherein performing the filter operation comprises:
generating a query to select records of the first multi-dimensional data matching the respective one or more data values corresponding to the first slice.

11. The system of claim 9, the operations further comprising:
rendering the plurality of slices of the first face of the first polyhedron determined to be closest in distance to the camera with a depth corresponding to a depth of the first polyhedron in a direction orthogonal to the plurality of slices.

12. The system of claim 11, the operations further comprising:
rotating the first polyhedron based on a rotation command;
determining that a second face of the first polyhedron is closest in distance to the camera;
rendering the plurality of slices of the first face of the first polyhedron with depth corresponding to a surface of the polyhedron; and
rendering a plurality of slices of the second face of the first polyhedron with a depth corresponding to a depth of the first polyhedron in a direction orthogonal to the plurality of slices of the second face.

13. The system of claim 12, the operations further comprising:
providing a label corresponding to the first face of the polyhedron, wherein the rotation command is determined based on an interaction with the label.

14. A computer readable storage device having instructions stored thereon, execution of which, by one or more processing devices, causes the one or more processing devices to perform operations comprising:

rendering, by one or more computing devices, first multi-dimensional data in a first polyhedron, wherein a first face of the first polyhedron determined to be closest in distance to a camera is depicted as a plurality of independently removable slices corresponding to respective one or more data values of a dimension of the multi-dimensional data;

receiving, by the one or more computing devices, a command to remove a first slice of the plurality of slices from the rendered first polyhedron responsive to a UI input interaction with the depiction of the first slice;

performing, by the one or more computing devices, a filter operation on each of the dimensions of the first multi-dimensional data responsive to the command to remove the first slice using the respective one or more data values corresponding to the first slice to produce second multi-dimensional data that is a subset of the first multi-dimensional data;

rendering, by the one or more computing devices, the first slice as a second polyhedron separate from the first polyhedron, wherein an appearance of the second polyhedron is based on the second multi-dimensional data;

receiving, by the one or more computing devices, a UI input interaction of a command to remove a second slice of the plurality of slices from the first polyhedron and to place the second slice in the second polyhedron;

performing, by the one or more computing devices, a filter operation on each of the dimensions of the first multi-dimensional data responsive to the command to remove the second slice using the respective one or more data values corresponding to the second slice to produce third multi-dimensional data that is a subset of the first multi-dimensional data;

merging, by the one or more computing devices, the third multi-dimensional data with the second multi-dimensional data based on the command to place the second slice in the second polyhedron; and rendering, by the one or more computing devices, the second polyhedron, wherein the appearance of the second polyhedron is based on the second multi-dimensional data merged with the third multi-dimensional data.

15. The computer readable storage device of claim 14, wherein performing the filter operation comprises:

generating a query to select records of the first multi-dimensional data matching the respective one or more data values corresponding to the first slice.

16. The computer readable storage device of claim 14, the operations further comprising:

rendering the plurality of slices of the first face of the first polyhedron determined to be closest in distance to the camera with a depth corresponding to a depth of the first polyhedron in a direction orthogonal to the plurality of slices.

17. The computer readable storage device of claim 16, the operations further comprising:

rotating the first polyhedron based on a rotation command;

determining that a second face of the first polyhedron is closest in distance to the camera;

rendering the plurality of slices of the first face of the first polyhedron with depth corresponding to a surface of the polyhedron; and rendering a plurality of slices of the second face of the first polyhedron with a depth corresponding to a depth of the first polyhedron in a direction orthogonal to the plurality of slices of the second face.

* * * * *